Dec. 4, 1962 P. F. OLTON 3,066,782
POSITIONING CONTROL MECHANISM FOR MILLING MACHINES
Original Filed Feb. 18, 1957 23 Sheets-Sheet 1
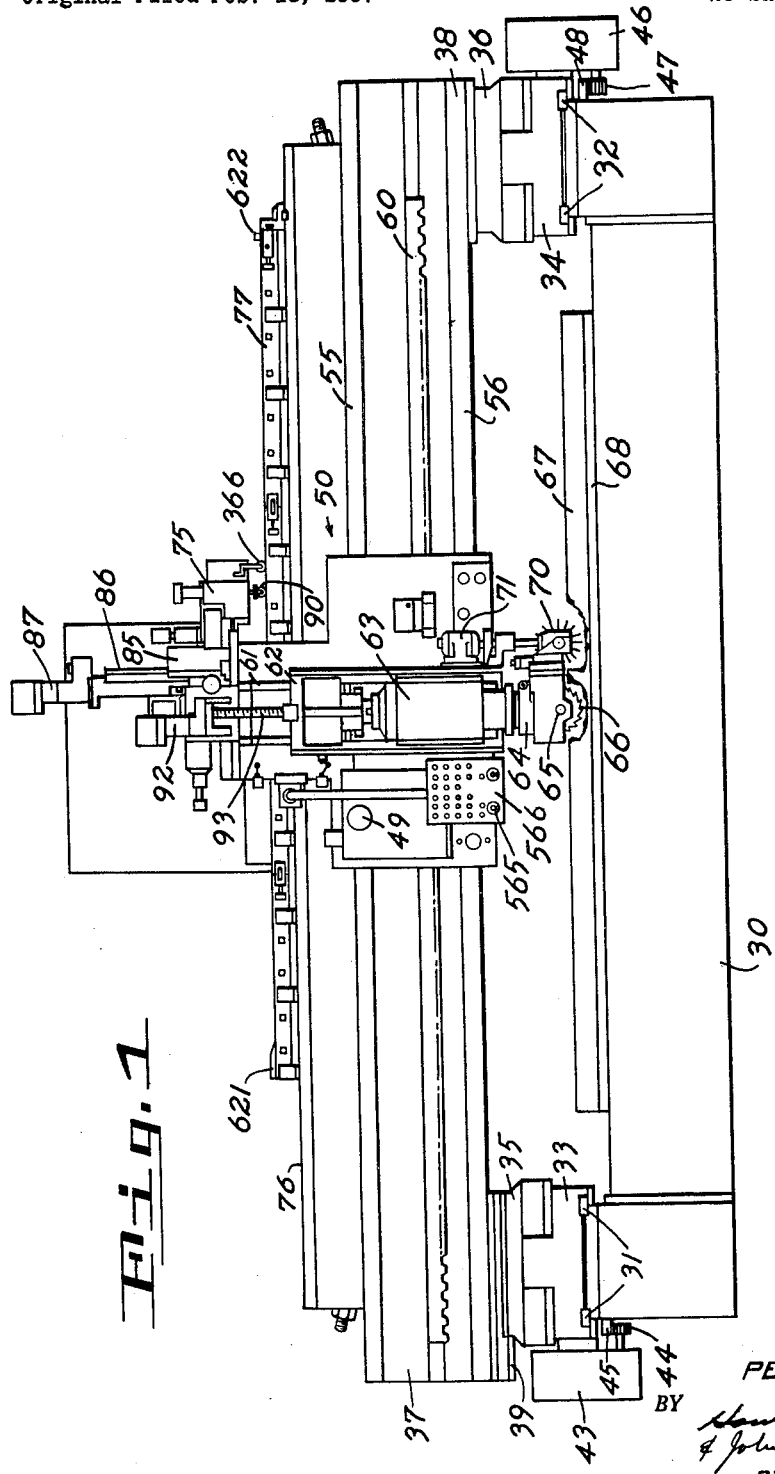
INVENTOR.
PETER F. OLTON.
BY
ATTORNEYS.

Dec. 4, 1962 P. F. OLTON 3,066,782
POSITIONING CONTROL MECHANISM FOR MILLING MACHINES
Original Filed Feb. 18, 1957 23 Sheets-Sheet 2
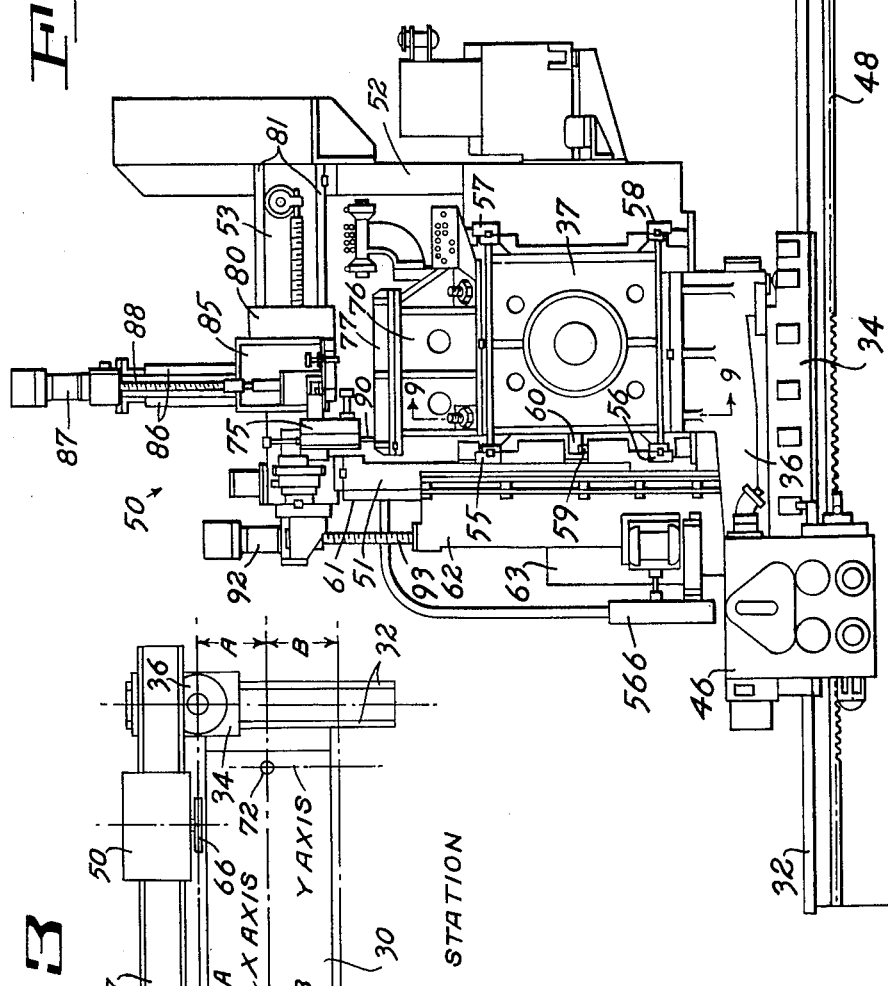
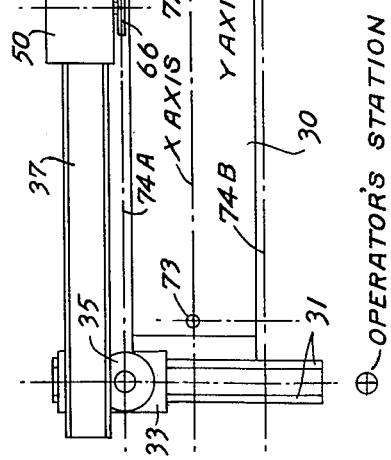
INVENTOR.
PETER F. OLTON.
BY
ATTORNEYS.

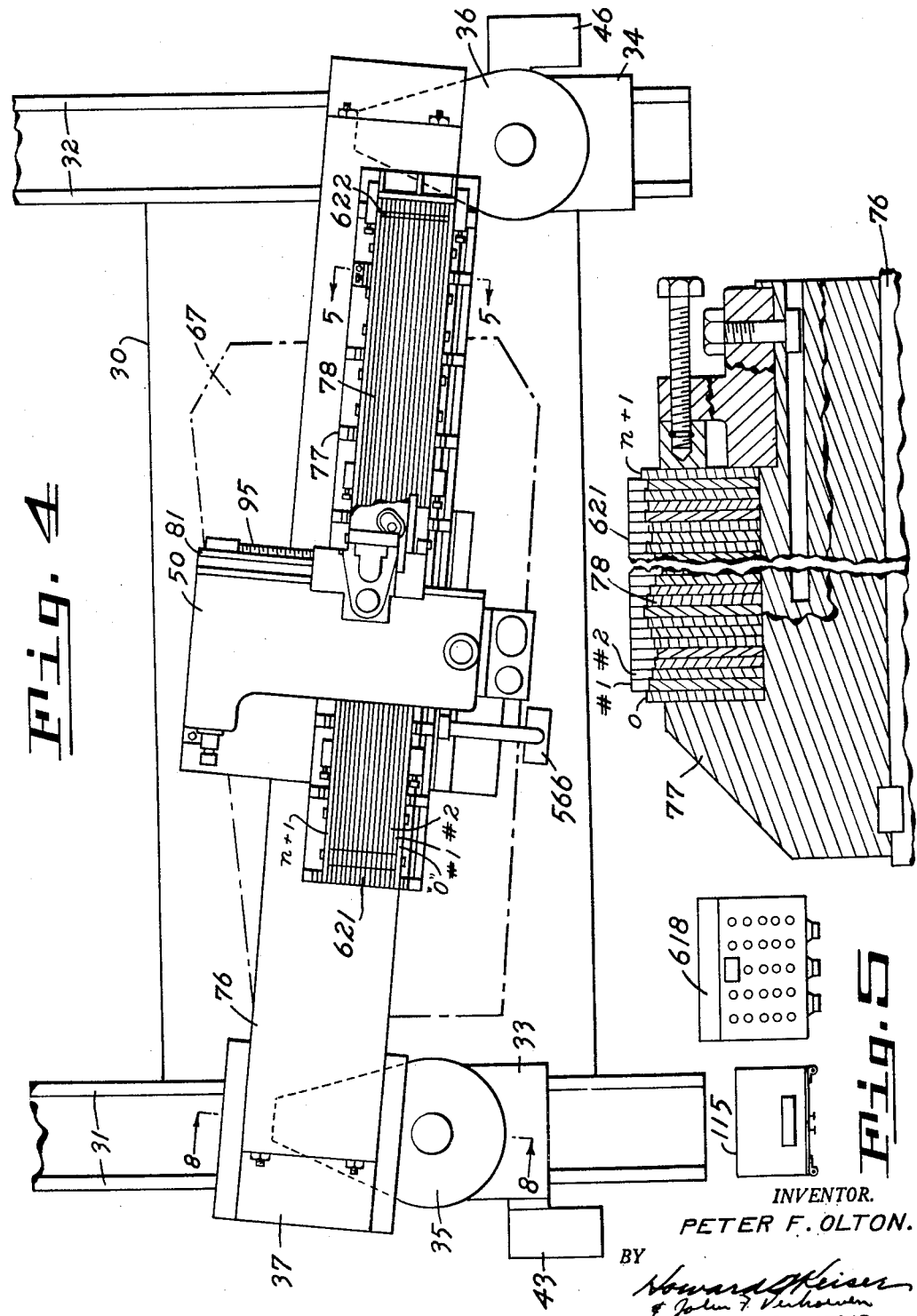

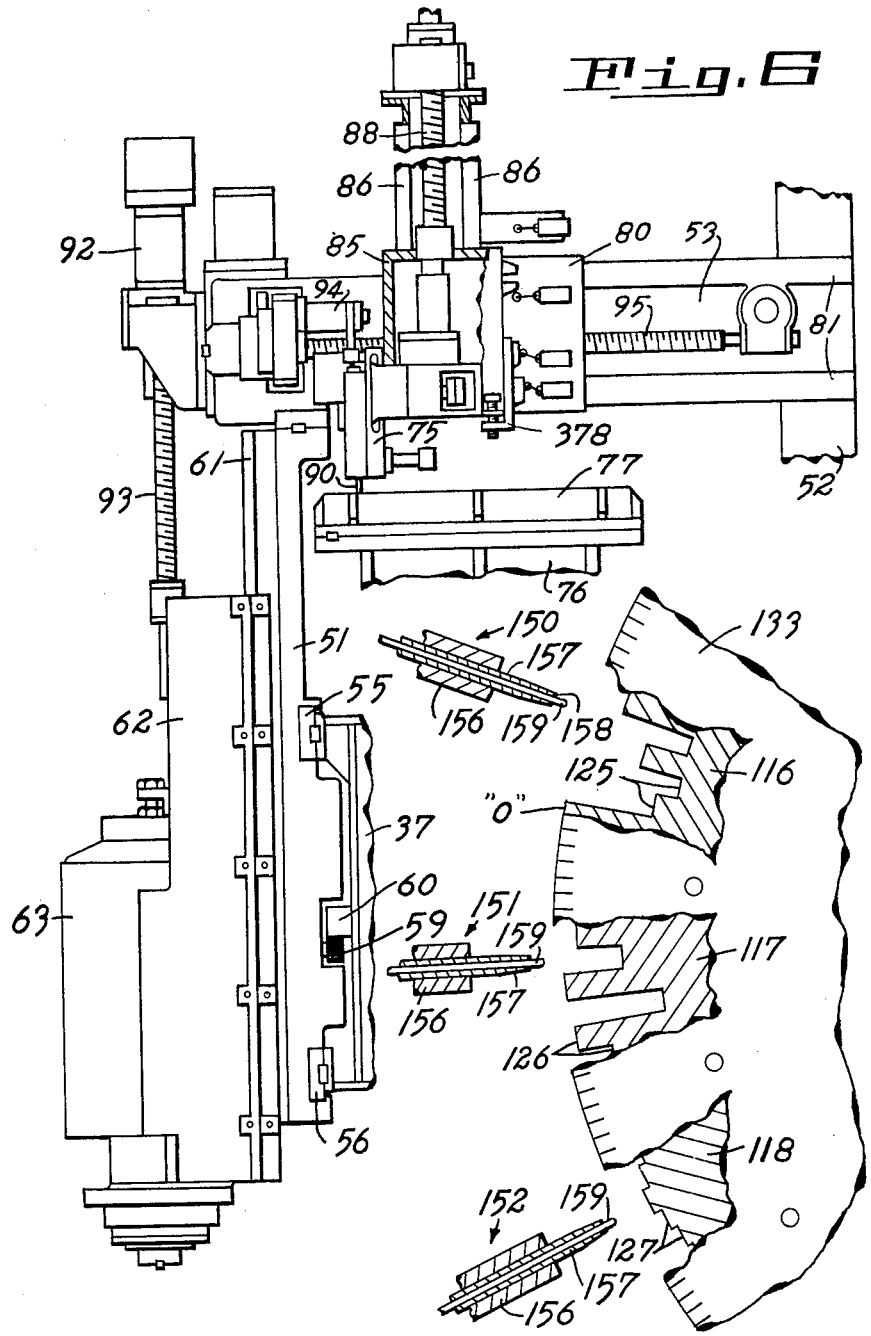

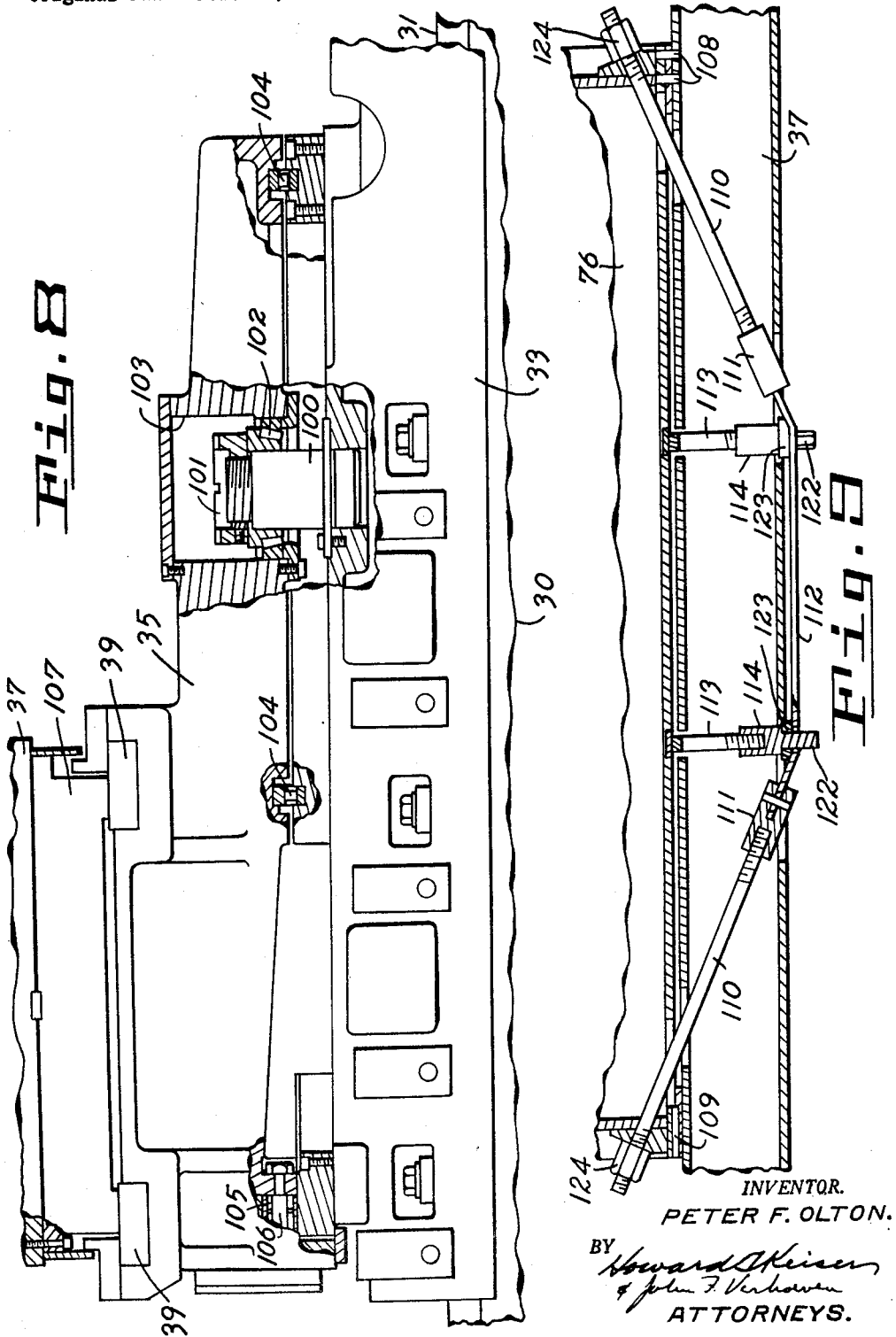

Dec. 4, 1962 P. F. OLTON 3,066,782
POSITIONING CONTROL MECHANISM FOR MILLING MACHINES
Original Filed Feb. 18, 1957 23 Sheets-Sheet 6

INVENTOR.
PETER F. OLTON.
BY
ATTORNEYS.

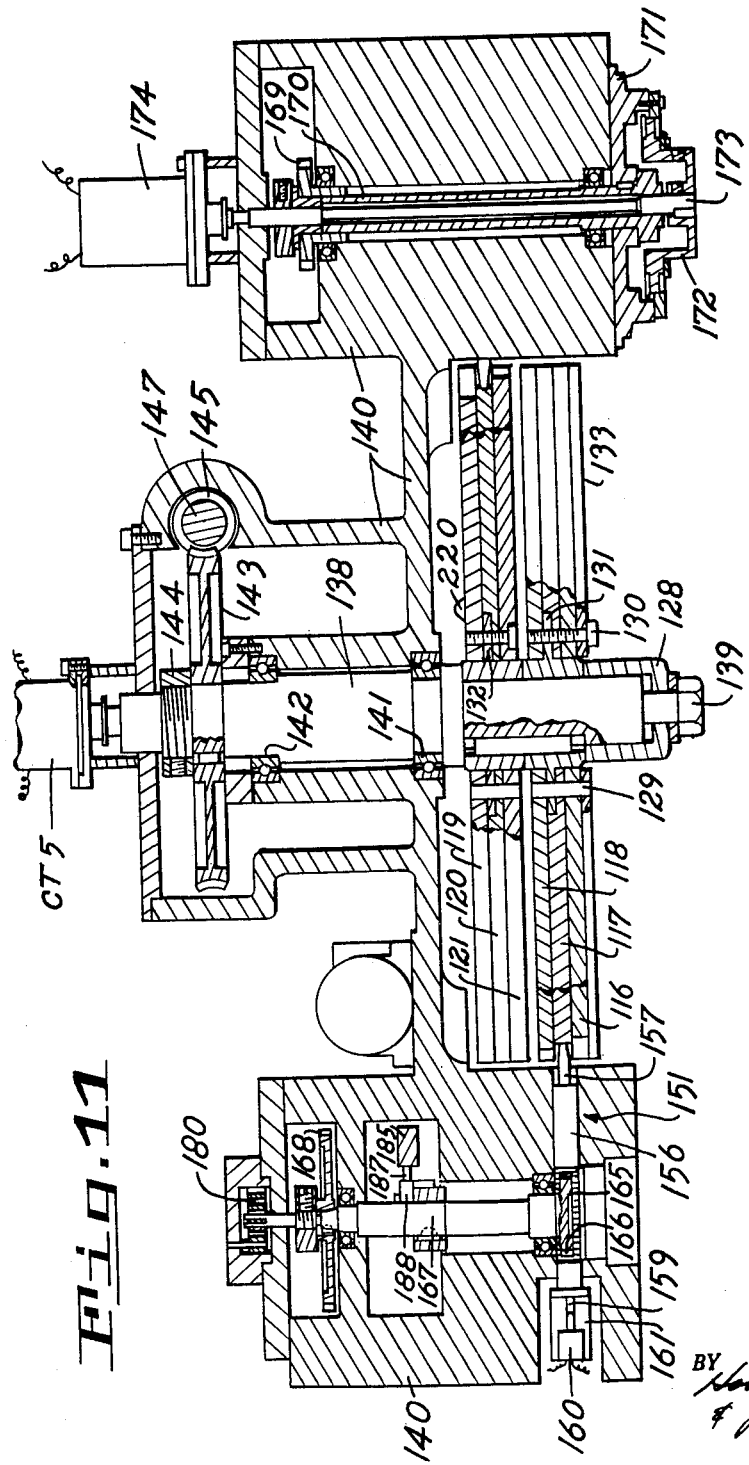

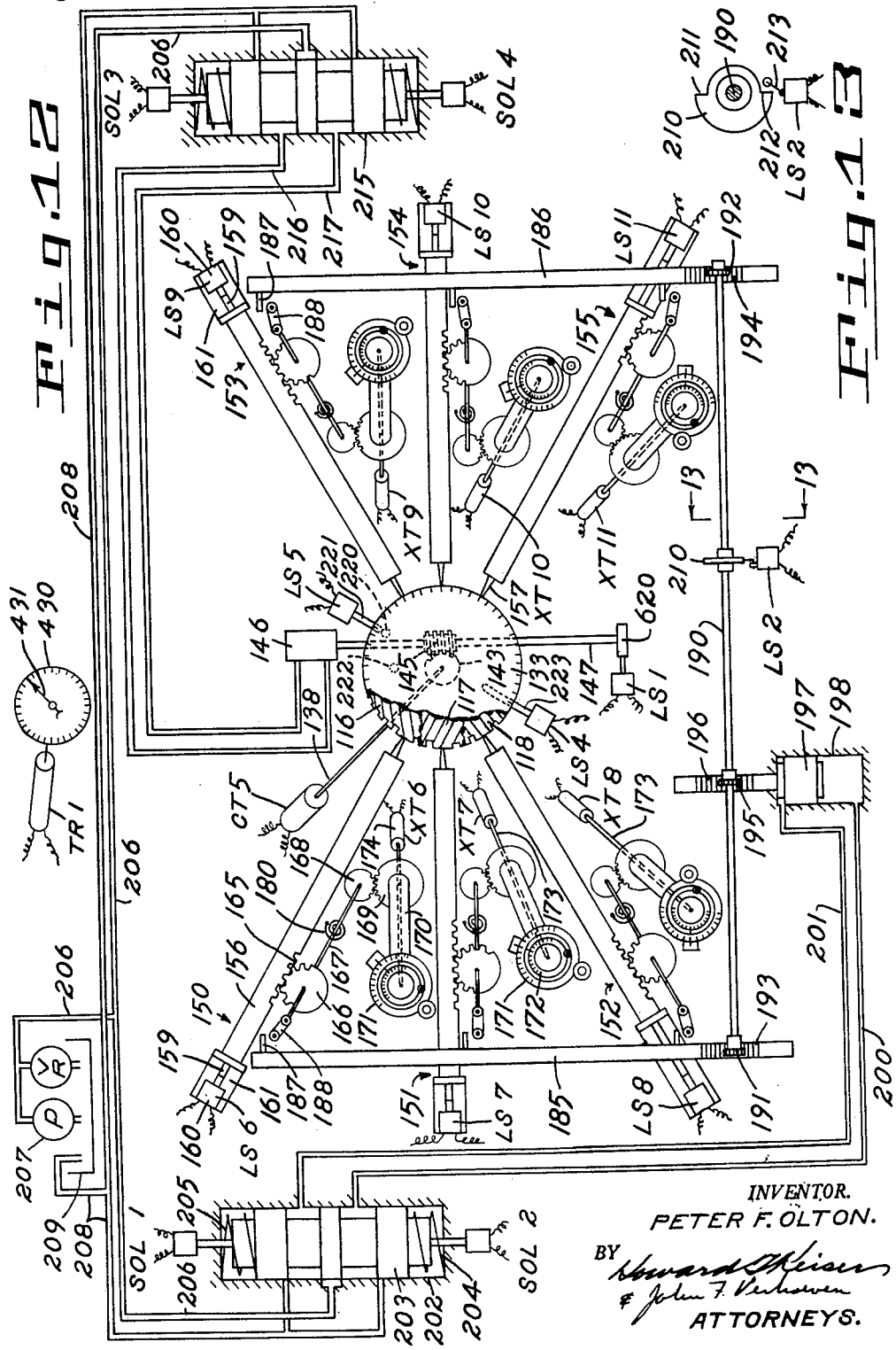

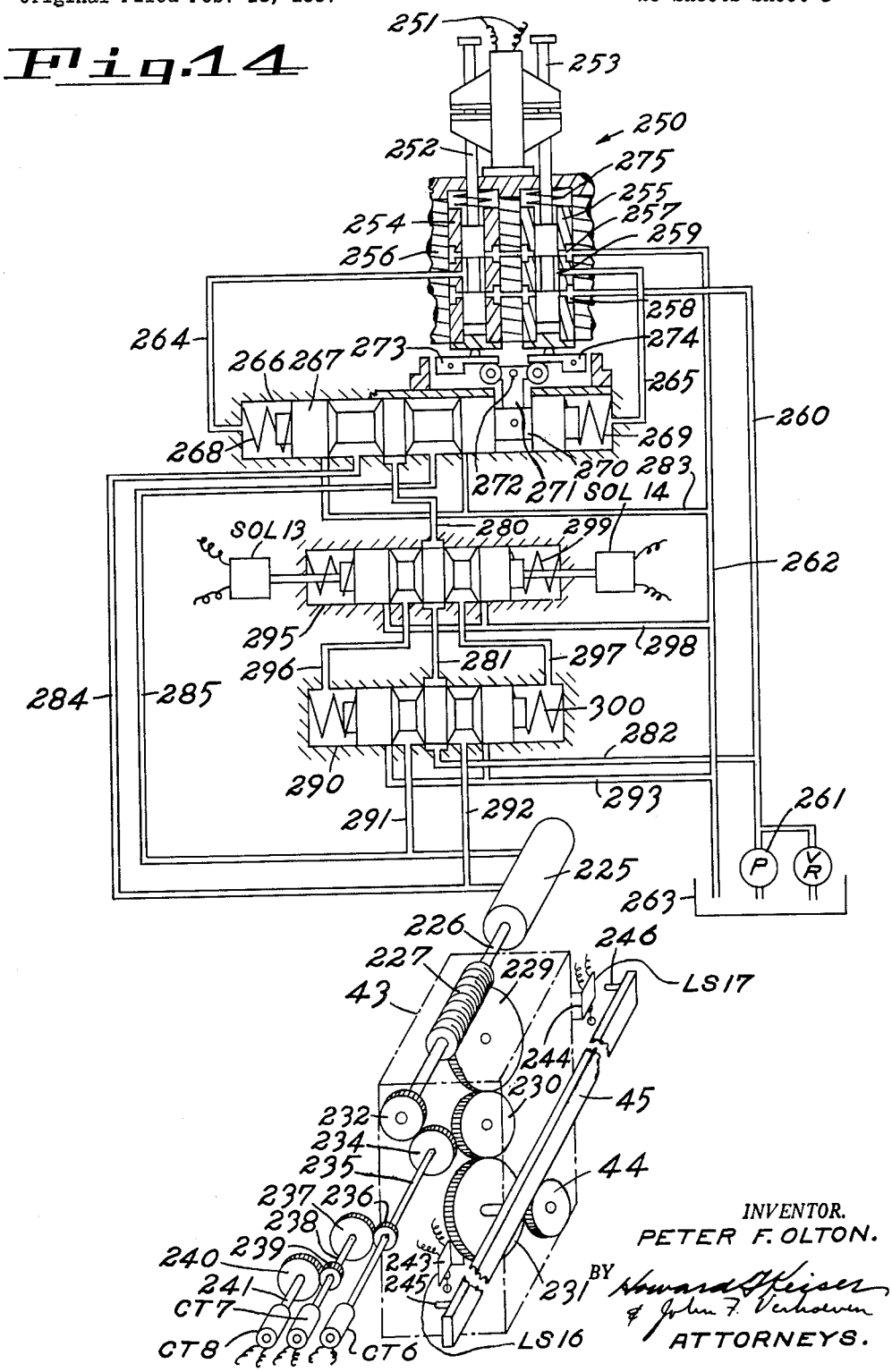

INVENTOR.
PETER F. OLTON.
BY
ATTORNEYS.

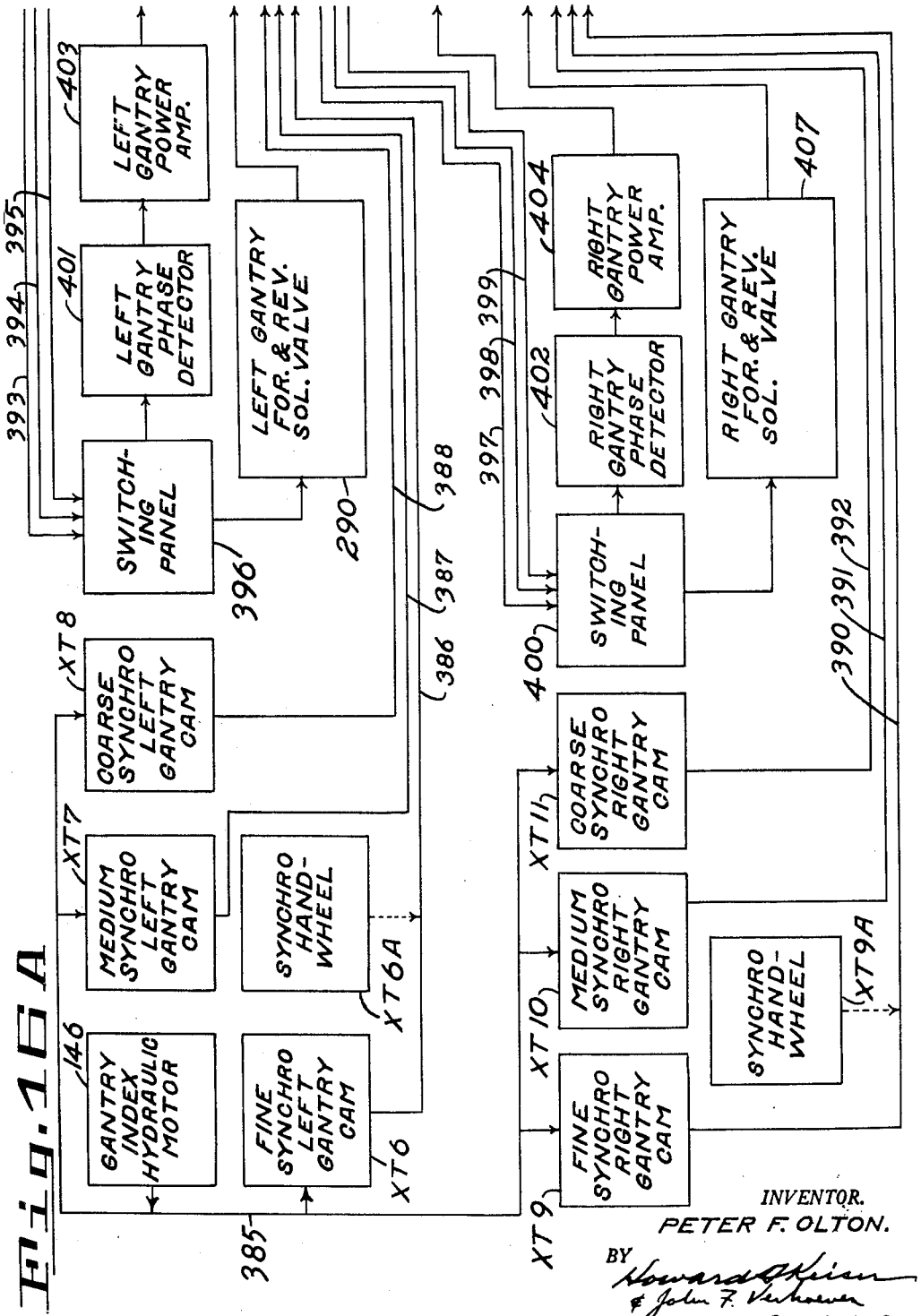

Dec. 4, 1962 P. F. OLTON 3,066,782
POSITIONING CONTROL MECHANISM FOR MILLING MACHINES
Original Filed Feb. 18, 1957 23 Sheets-Sheet 12
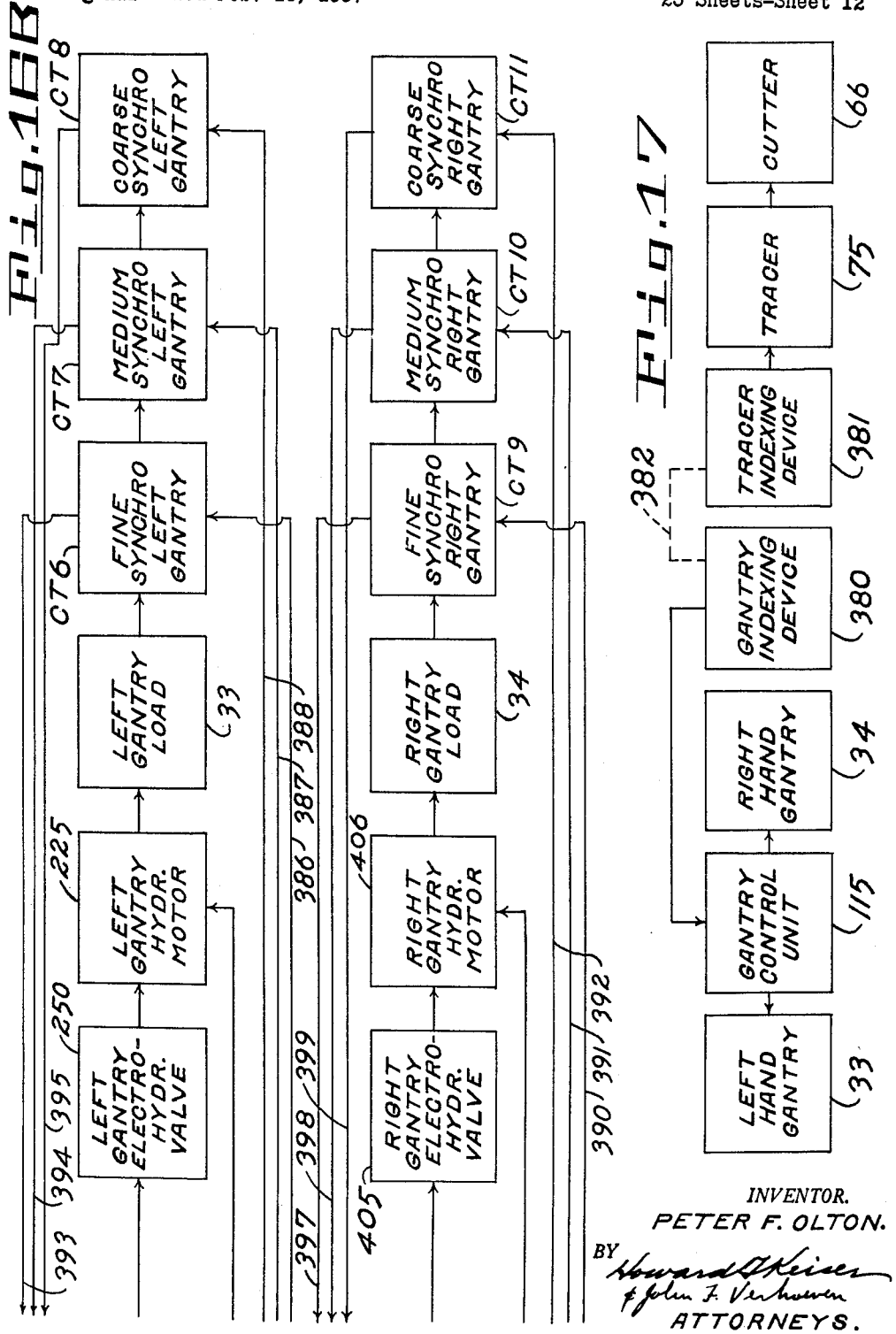
INVENTOR.
PETER F. OLTON.
BY
ATTORNEYS.

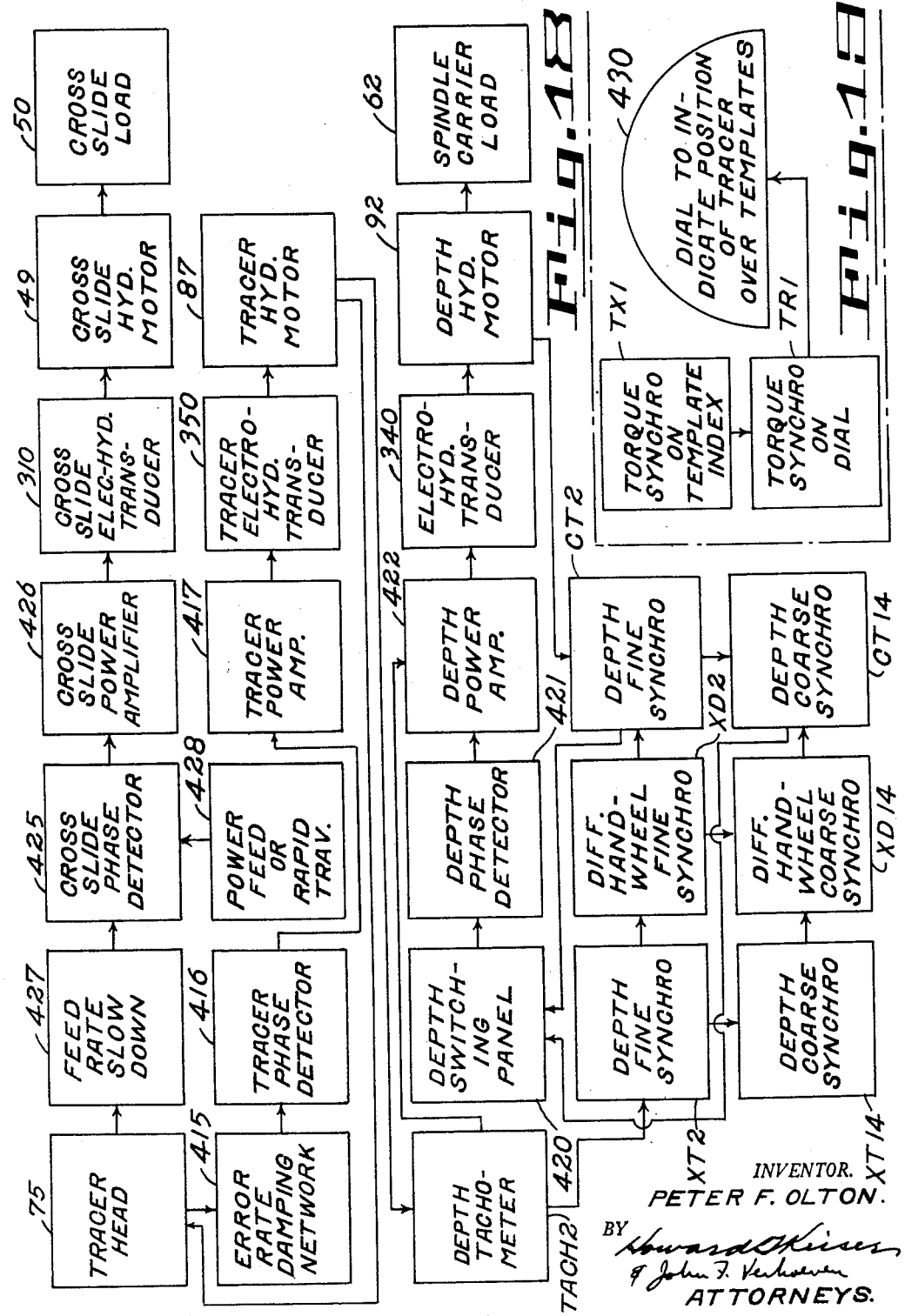

Dec. 4, 1962  P. F. OLTON  3,066,782
POSITIONING CONTROL MECHANISM FOR MILLING MACHINES
Original Filed Feb. 18, 1957  23 Sheets-Sheet 14

INVENTOR.
PETER F. OLTON.
BY
ATTORNEYS.

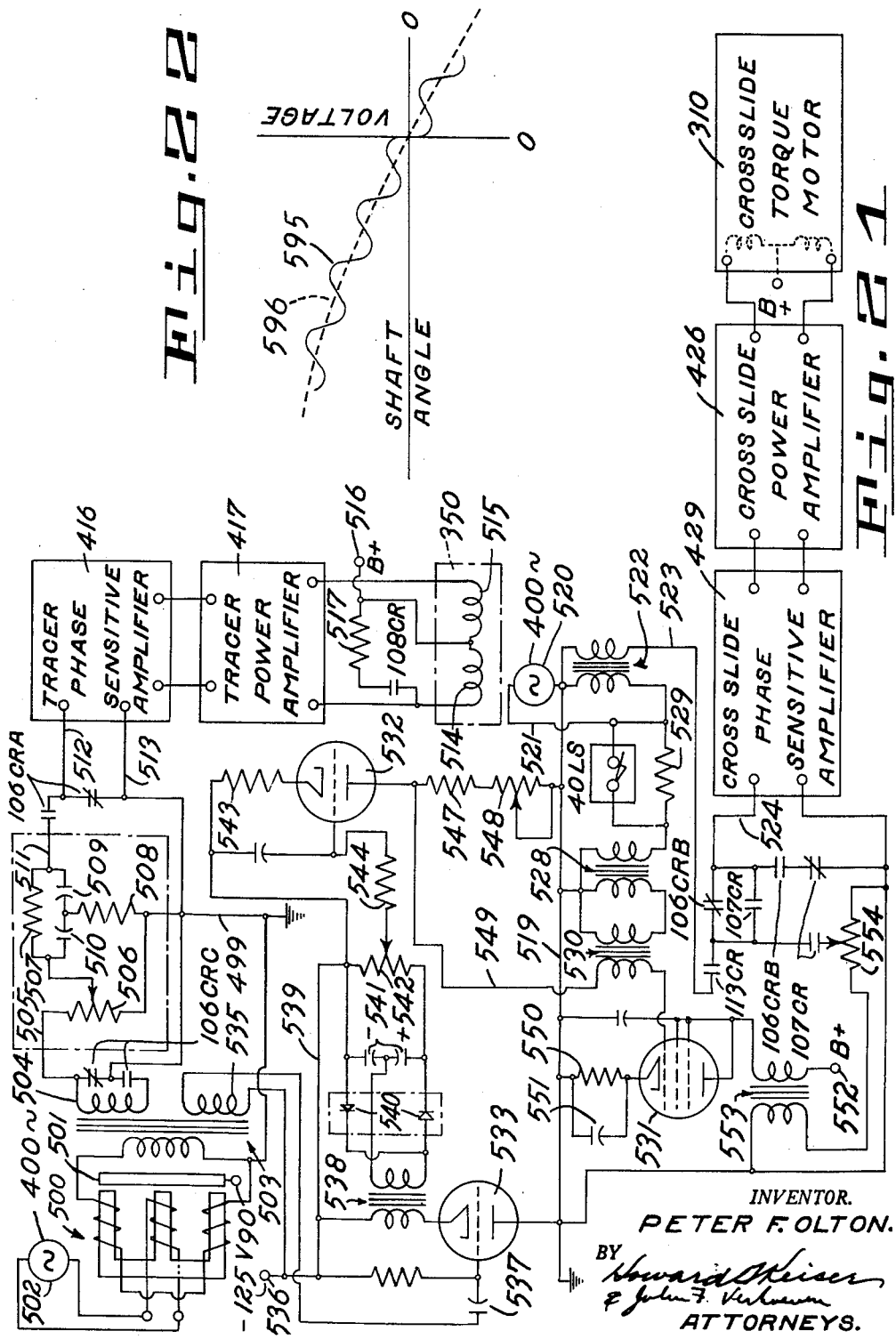

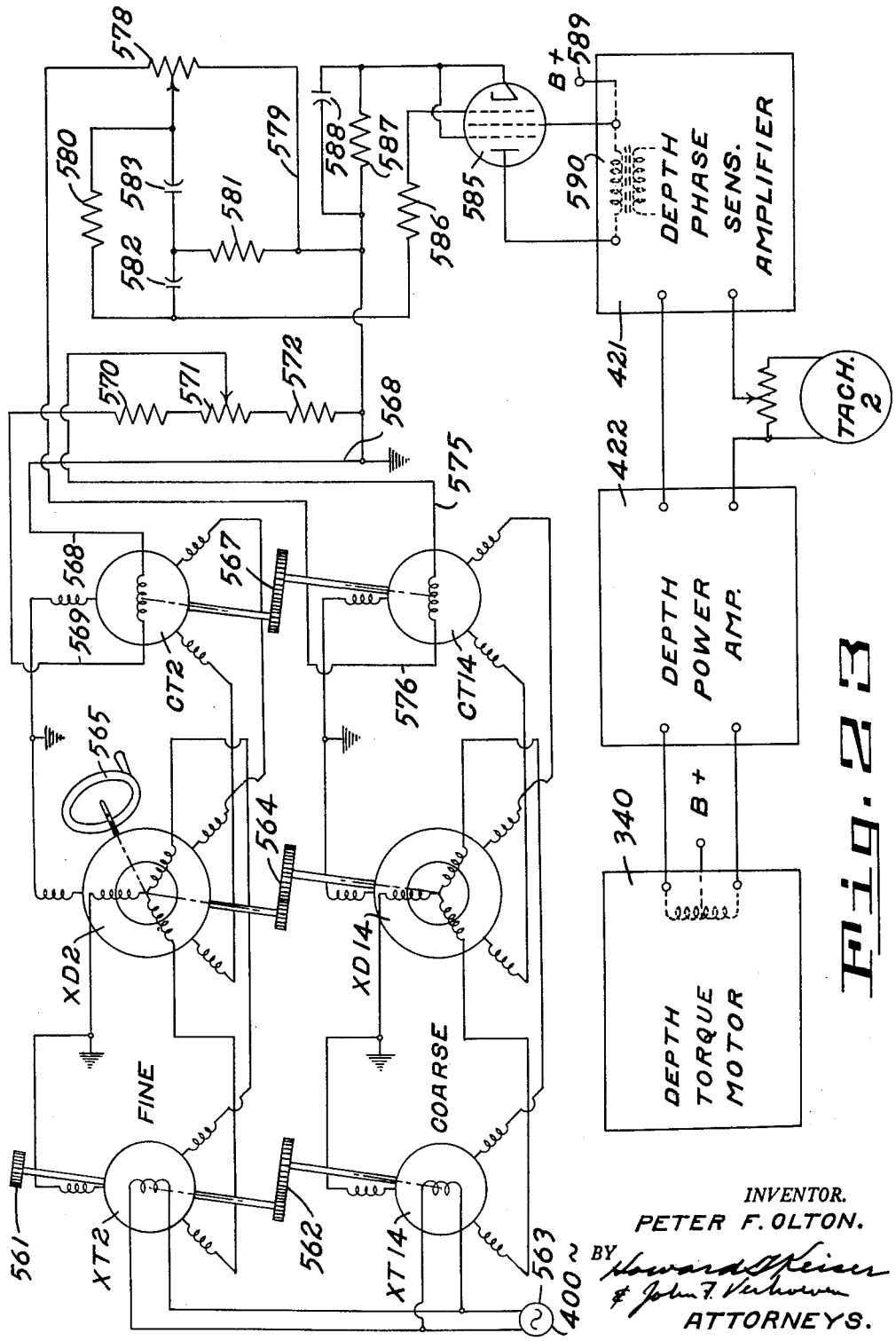

Dec. 4, 1962     P. F. OLTON     3,066,782
POSITIONING CONTROL MECHANISM FOR MILLING MACHINES
Original Filed Feb. 18, 1957     23 Sheets-Sheet 18

INVENTOR.
PETER F. OLTON.
BY
ATTORNEYS.

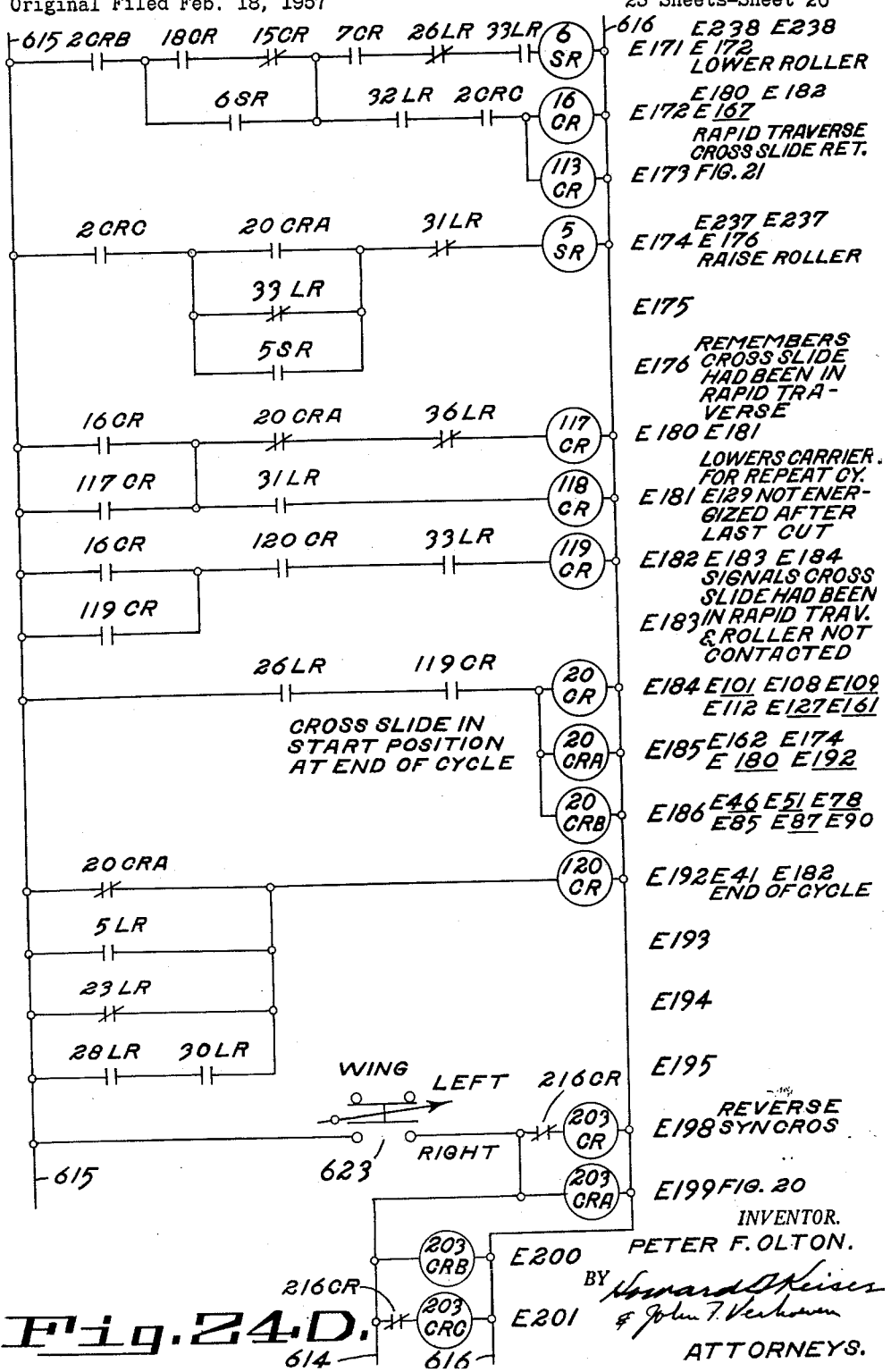

POSITIONING CONTROL MECHANISM FOR MILLING MACHINES

INVENTOR.
PETER F. OLTON.
BY
ATTORNEYS.

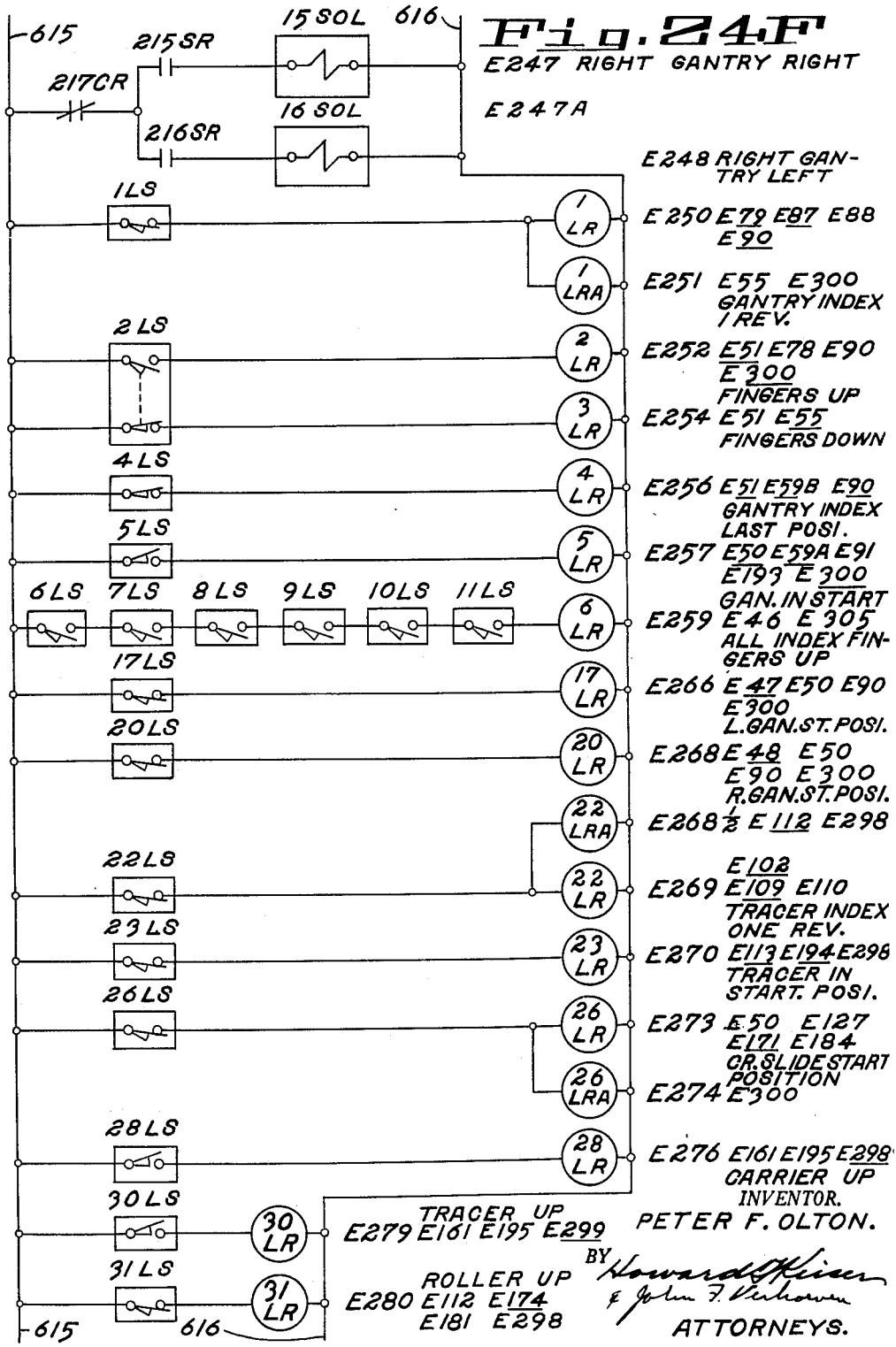

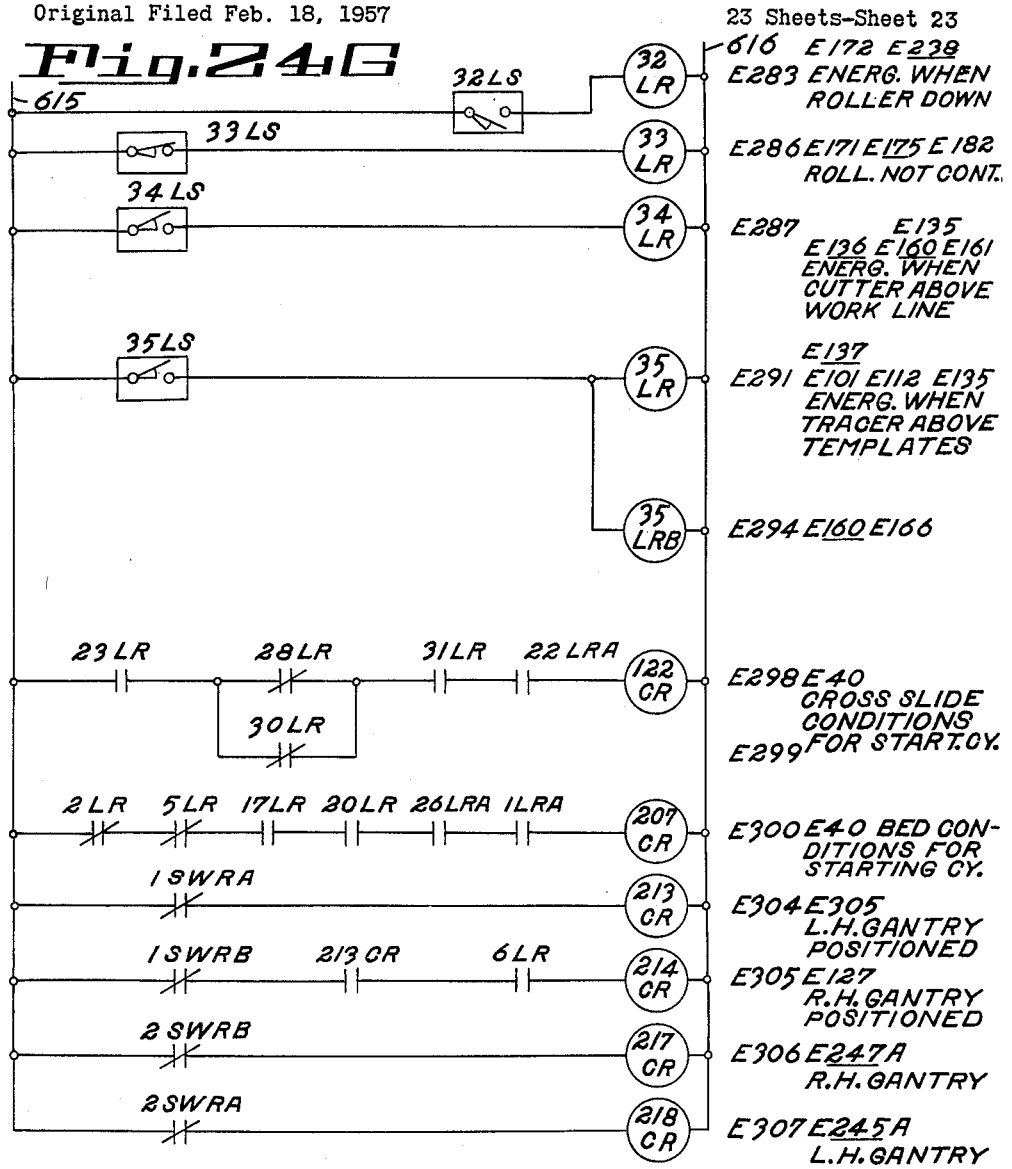
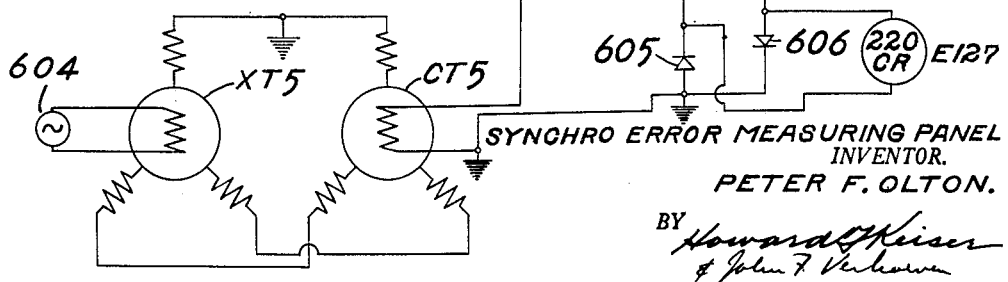
Fig. 25 — Synchro Error Measuring Panel
Tracer & Gantry Index In-Step Indicator ial control circuits of the machine.

United States Patent Office 3,066,782
Patented Dec. 4, 1962

3,066,782
POSITIONING CONTROL MECHANISM FOR MILLING MACHINES
Peter F. Olton, Cincinnati, Ohio, assignor to The Cincinnati Milling Machine Co., Cincinnati, Ohio, a corporation of Ohio
Original application Feb. 18, 1957, Ser No. 640,744. Divided and this application Mar. 4, 1960, Ser. No. 12,815
11 Claims. (Cl. 192—142)

This invention relates to improvements in machine tools and, more particularly, to an automatic machine for effecting non-parallel cuts of variable depth in a workpiece of large dimensions such as an airplane wing.

This application is a division of my copending patent appliaction, Serial No. 640,744 filed February 18, 1957, now Patent No. 2,937,576, and entitled Automatic Milling Machine.

In view of recent developments in high speed aircraft, it is desirable to fashion the wings of these craft from solid pieces of metal so that the skin and stiffener elements are of integral one-piece construction. In so doing, it is necessary to be able to effect non-parallel cuts of variable depth in the blank from which the wing is formed in order to produce the longitudinally extending stiffener elements which ordinarily must converge toward one another in conformity with the taper of the wing.

To minimize the time required for the complete machining of the wing sections, it is necessary to design the machine for completely automatic operation in effecting such cuts and to cause it to automatically return to a work loading and unloading position at the conclusion of the machining operation. It is also desirable that the machine be adapted to fashion either right hand or left hand wings with equal facility and with a minimum of time required for the change-over. In addition to these desiderata, it is important that the machine be so constructed that the cuts produced thereby in the workpiece may be held to the close tolerances generally required by the aircraft industry in connection with the manufacture of high performance aircraft. In a machine of the size required for machining entire wing sections, the ability of the machine to produce the surfaces with the same degree of accuracy as is ordinarily required for much smaller parts is, of course, very difficult of realization and has necessitated the incorporation therein of many new and unique features of design.

Accordingly, it is an object of the present invention to provide a machine tool which will automatically effect a series of non-parallel cuts of variable depth in a workpiece of large dimensions.

Another object of the invention is to provide a machine tool in which the various set-ups required for making the required non-parallel cuts are effected under the control of a storage member on which the data concerning the set-ups is recorded.

Another object of the invention is to provide a machine tool in which the same data recorded on the storage member for the machining of left hand parts may also be utilized for the machining of right hand parts.

Another object of the invention is to provide a machine tool in which the storage member is capable of being indexed from one position to another to effecutate the various set-ups required for the different cuts, and in which the tracer for controlling the depth of cut is stepped from one template to the next in synchronism therewith to enable the depth of each cut to be independently controlled.

Another object of the invention is to provide a beam miller of improved construction which is capable of machining a workpiece of large dimensions with a high degree of accuracy.

Another object of the invention is to provide a record-controlled positioning device in which a plurality of synchro-transmitters are independently positioned in accordance with recorded data, and a plurality of geared synchro-receivers are operatively connected therewith for controlling a servo mechanism.

Another object of the invention is to provide a device of the type described in the preceding object in which provision is made for reversing the sense of the synchro receivers to produce reverse positioning of the gantries from a given datum line.

With these and other objects in view which will become apparent from the following descriptions, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a front view of a machine embodying the features of the present invention.

FIG. 2 is a right end view of the machine shown in FIG. 1.

FIG. 3 is a diagrammatic plan view illustrating the arrangement of the machine.

FIG. 4 is a plan view of the machine shown in the previous figures.

FIG. 5 is a cross sectional view taken along the line 5—5 of FIG. 4.

FIG. 6 is a detail view showing the arrangement of the tracer and spindle carrier mechanisms.

FIG. 7 is a fragmenetary view illustrating the gantry index cams and the fingers for sensing the notches in the cams.

FIG. 8 is a partial cross sectional view of the left hand gantry swivel taken along the line 8—8 in FIG. 4.

FIG. 9 is a cross sectional view taken along the line 9—9 in FIG. 2.

FIG. 11 is a cross sectional view taken along the line 11—11 in FIG. 10.

FIG. 12 is a hydraulic diagram of the gantry cam ctontrol and indexing mechanism.

FIG. 13 is a cross sectional view taken along the line 13—13 in FIG. 12.

FIG. 14 is a hydraulic diagram of the drive mechanism for the left hand gantry.

FIGS. 16A and 16B taken together comprise a block diagram of the gantry servomechanisms.

FIG. 17 is a block diagram of the gantry and tracer indexing mechanisms.

FIG. 18 is a block diagram of the cross slide, tracer and spindle carrier servomechanisms.

FIG. 19 is a block diagram of the tracer position indicating mechanism.

Figure 20:
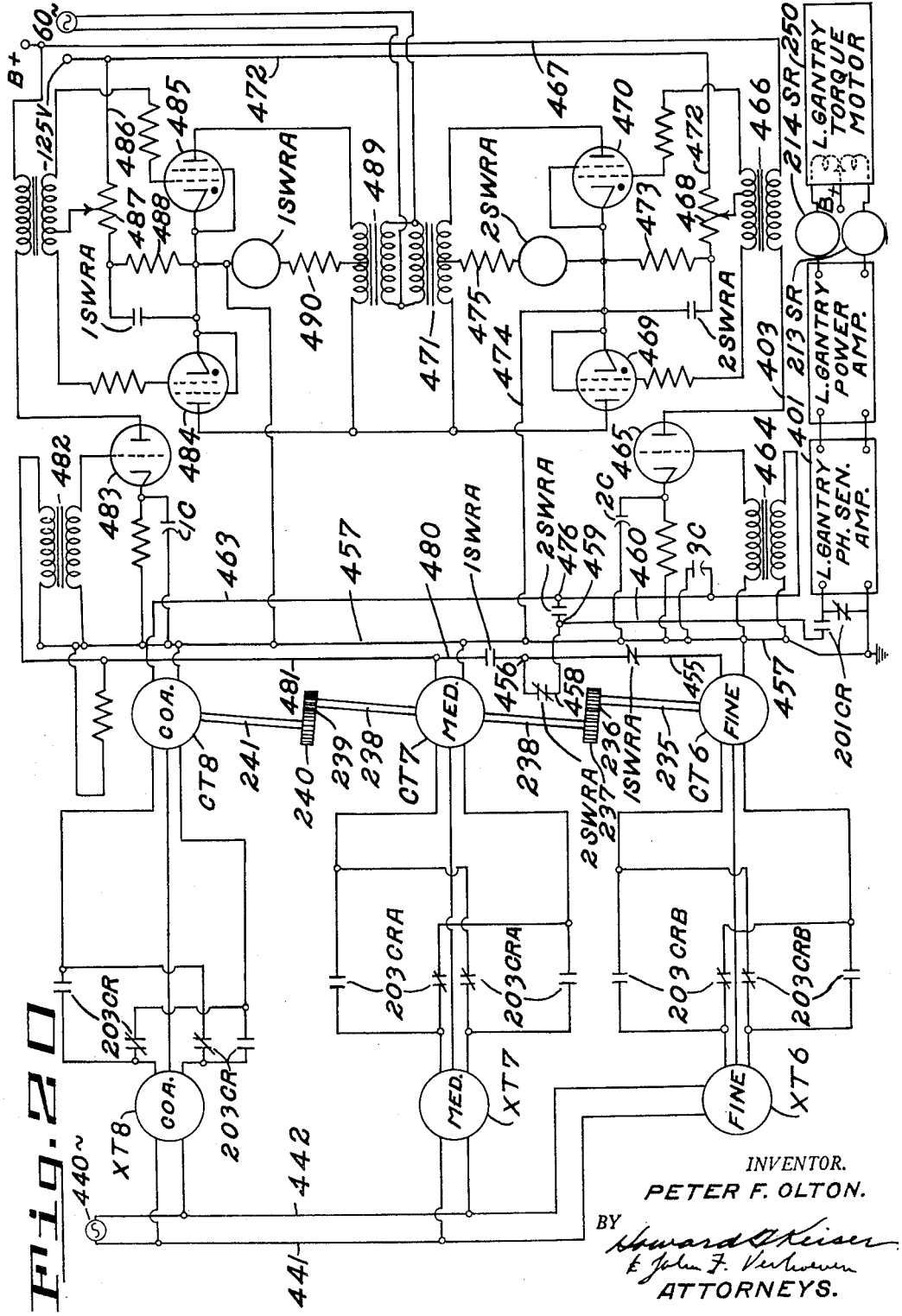
Figure 24A:
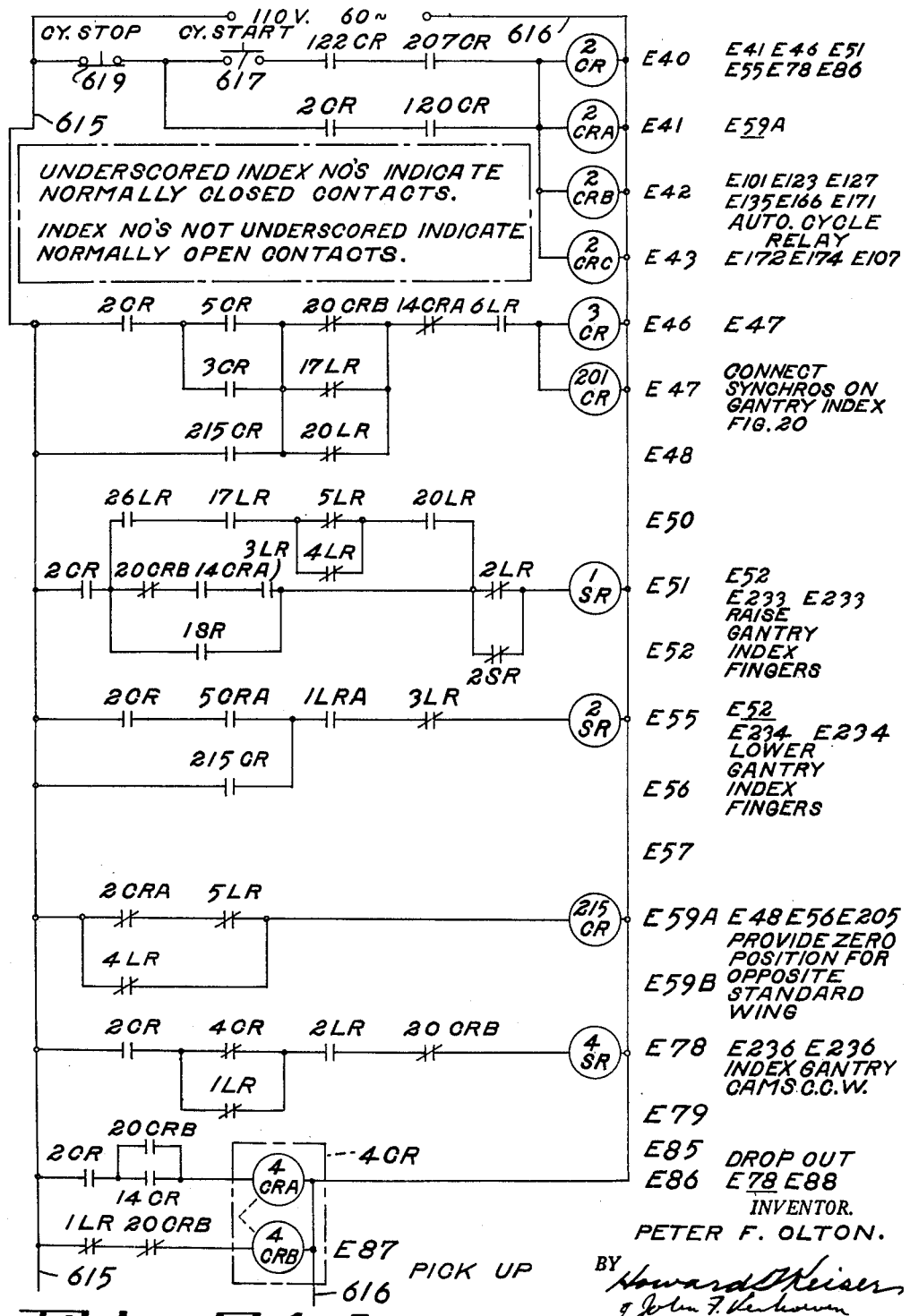
Figure 24B:
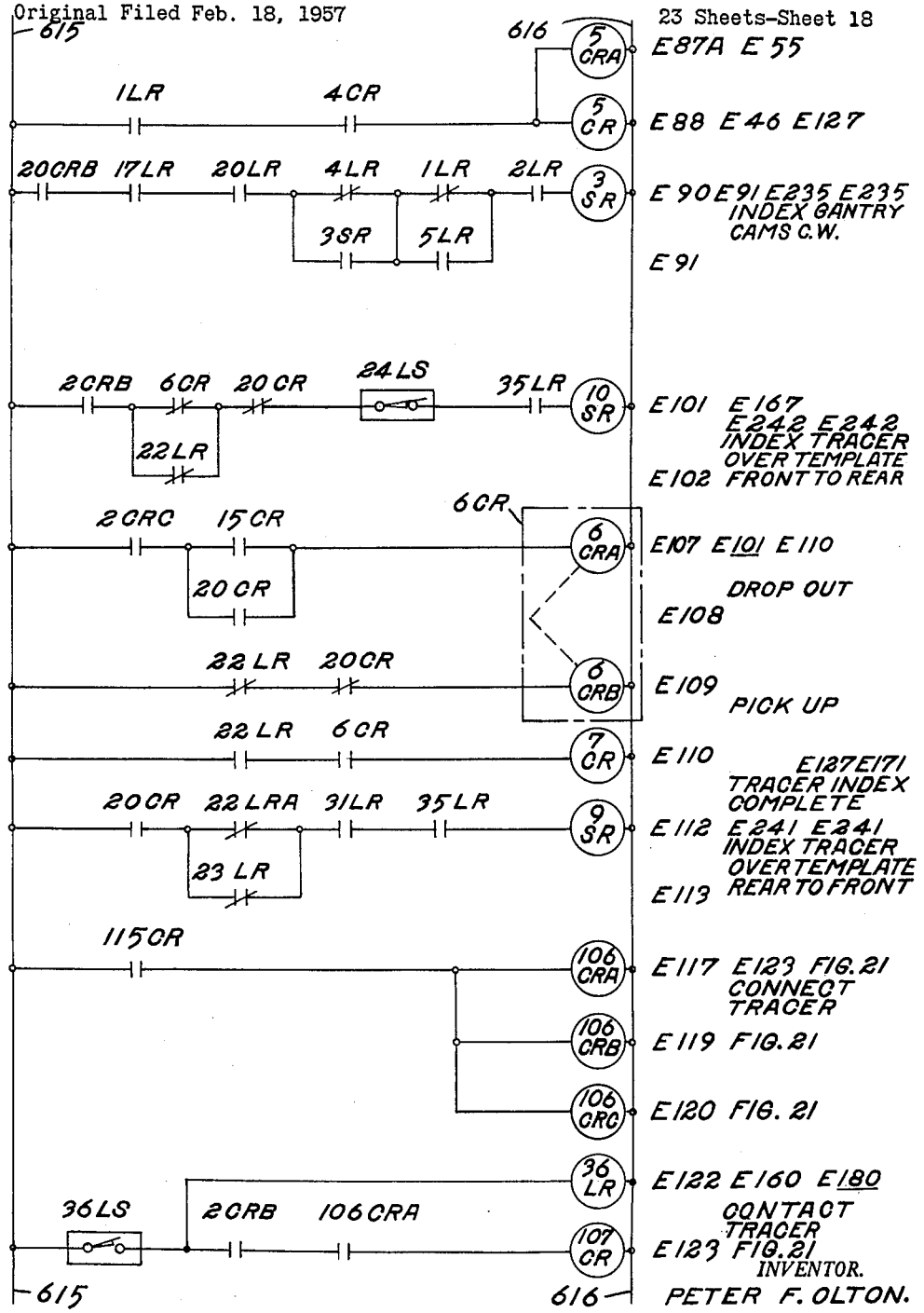
Figure 24C:
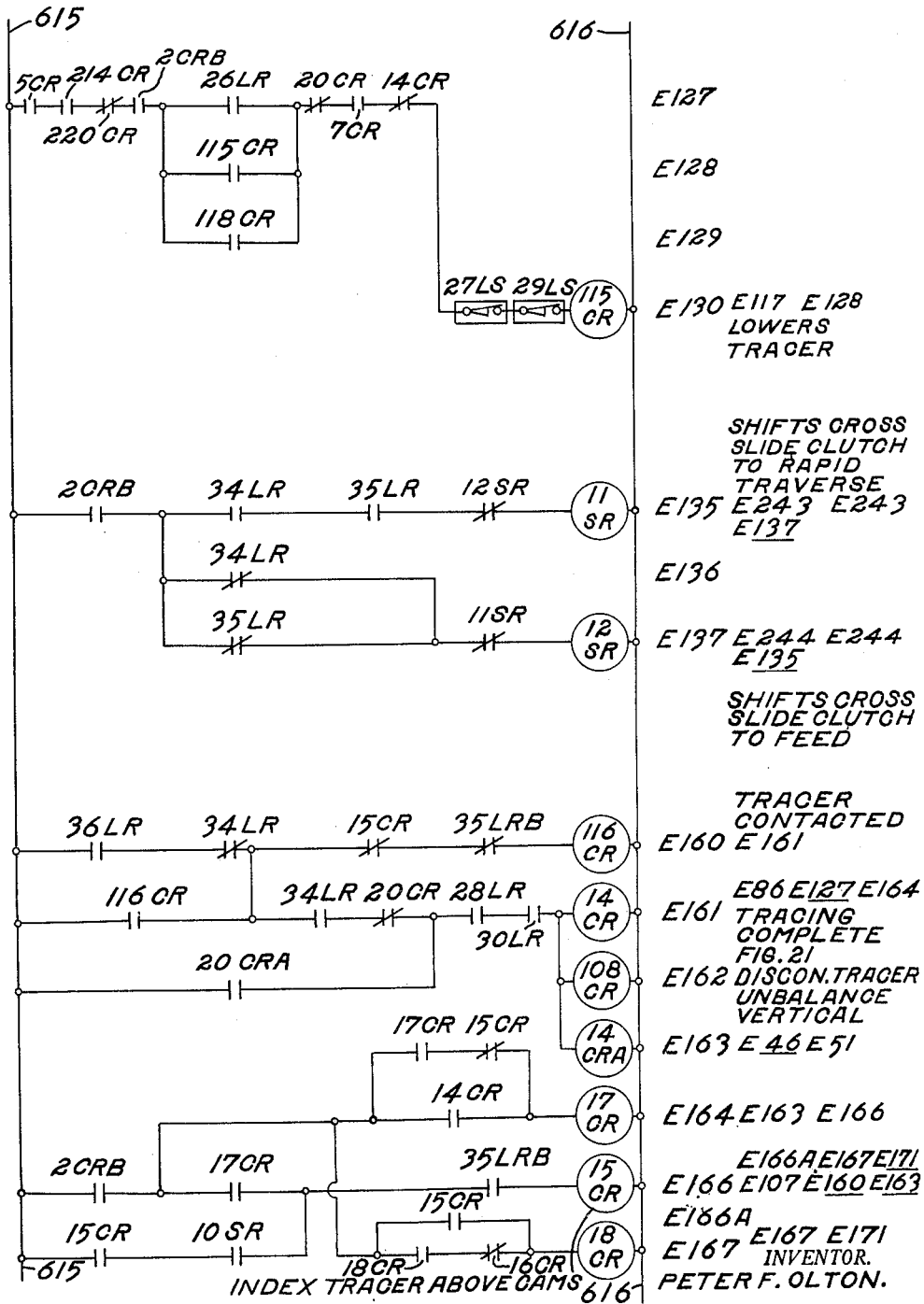
Figure 24E:
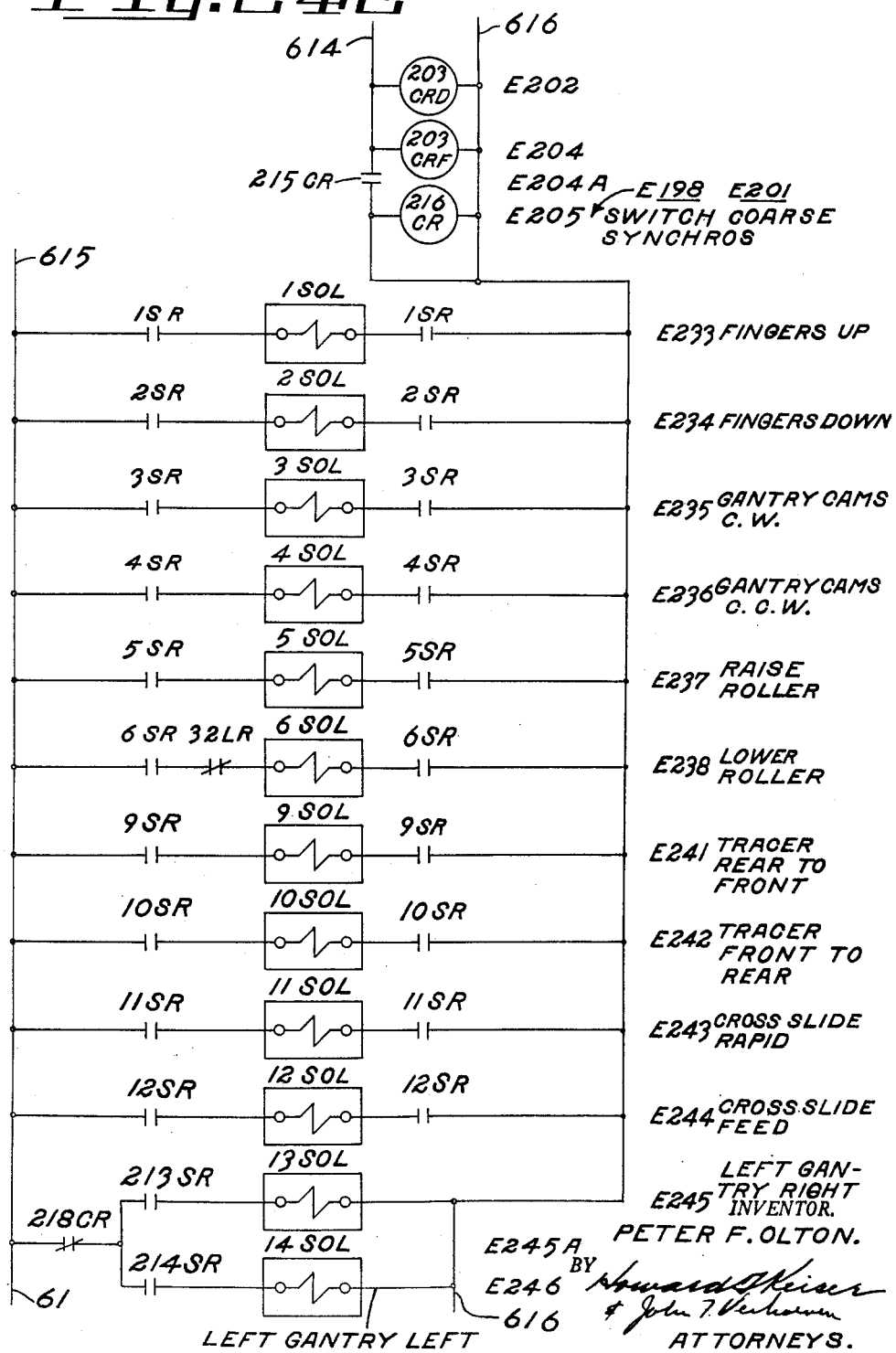

FIG. 20 is a wiring diagram of the servomechanism for the left hand gantry.

FIG. 21 is a wiring diagram of the tracer and cross slide servomechanisms.

FIG. 22 is a graph illustrating the action of the synchronizing network for the spindle carrier servomechanism.

FIG. 23 is a wiring diagram of the spindle carrier servomechanism.

FIGS. 24A, 24B, 24C, 24D, 24E, 24F, and 24G taken together comprise a wiring diagram illustrating the electrical control circuits of the machine.

FIG. 25 is a wiring diagram of the tracer and gantry in-step indicator.

Similar reference characters designate similar or identical elements and portions throughout the specification and throughout the different views of the drawings.

MACHINE STRUCTURE

For purposes of illustration, I have shown my invention as applied to a beam type milling machine, the general organization of which is illustrated in FIGS. 1 to 4 inclusive, of the drawings. As there shown, the machine includes an I-shaped bed 30 which is provided at its ends with transverse ways 31 and 32 on which are slidably supported gantries 33 and 34, respectively. Each of the gantries 33 and 34 carries a swivel 35 and 36, respectively, on which are supported the ends of a beam 37. As viewed in FIG. 1, the right hand end of the beam 37 is rigidly secured to the swivel 36 at 38, whereas the left hand end of the beam is provided with a pair of horizontal ways 39 which are slidably supported on corresponding ways provided on the swivel 35. Hence, as the left hand and right hand gantries 33 and 34, respectively, take up different positions along their respective ways 31 and 32, as shown in FIG. 4, the swivels will turn on the gantries, and the left hand end of the beam will be free to slide on its swivel so as to compensate for the varying distances between the swivels resulting from the different angular positions of the beam.

Each gantry has associated therewith a hydraulic drive mechanism for moving it to various preselected positions along the ways in accordance with information stored on a set of control cams hereinafter to be described. As seen in FIG. 1, the hydraulic drive mechanism for the left hand gantry 33 is contained within a housing 43 mounted on the side of the gantry which drives a spur gear 44 meshing with a rack 45 extending along the side of the bed and secured thereto beneath the ways 31. In a corresponding manner, the hydraulic drive mechanism for the right hand gantry 34 is contained within a housing 46 mounted on the gantry and driving a spur gear 47 meshing with a rack 48 secured to and extending along the right hand end of the bed beneath the ways 32.

Supported for sliding movement along the beam 37 is a cross slide 50 which is comprised of a front saddle 51, a rear saddle 52, and a cross rail 53 (FIG. 2) connecting the saddles. As seen in FIG. 2, the front saddle is slidable along ways 55 and 56 mounted on the front side of the beam 37, while the rear saddle is slidable along ways 57 and 58 mounted on the rear side of the beam. The cross slide is adapted to be driven along the beam by means of a hydraulic drive motor 49 carried by the front saddle 51 which turns a spur gear 59 meshing with a rack 60 fastened to the front side of the beam 37. The front saddle 51 is provided with a pair of vertical ways 61 (see also FIG. 1) on which a spindle carrier 62 is mounted for vertical sliding movement. As shown in FIG. 1, the carrier 62 has mounted thereon a spindle driving motor 63 which, through a suitable right angle drive mechanism 64, turns a spindle 65 on which a milling cutter 66 is mounted. Hence, as the cross slide 50 is traversed along the beam 37, the cutter 66 will effect a longitudinal cut in a workpiece 67 held in place beneath the cutter on the bed 30 by means of a vacuum chuck 68 or other suitable clamping means. If desired, a brush 70 driven by a motor 71 may be provided on the spindle carrier behind the cutter for removing the chips from the cut as the cutter moves along the workpiece.

As illustrated in FIG. 3 of the drawings, the machine is so designed that the centerline of the cutter 66 lies on the line connecting the pivot points of the swivels 35 and 36. This is accomplished by moving the swivels 35 and 36 forward on the gantries so that they lie the same distance in front of the beam as the cutter. There may be, of course, a slight departure from this design criterion when cutters of different widths are used for obtaining cuts of varying widths. This variation is normally small, however, and provision has been made in the gantry control mechanism, hereinafter to be described, for compensating for any slight departures from this condition. By means of this arrangement, i.e., placing the centerline of the cutter on the line connecting the pivots of the swivels, the computations required for determining the positions of the gantries, as measured from the X axis (FIG. 3), for each cut to be taken in the workpiece is greatly simplified. This arrangement has the further advantage of enabling both left hand and right hand parts to be made with the same gantry control cams.

As indicated in FIG. 3, the X axis is marked by two locating pins 72 and 73 provided in the bed 30 while the Y axis is located at right angles to the X axis and passes through the center of pin 72. These axes provide the basis for a coordinate system of measurement which is useful in laying out and locating the various control points on the workpiece.

In FIG. 3, the beam 37 is shown in its starting position at the rear of the machine with the cutter located on the rear base line 74A. The range of travel of the beam extends forwardly of this line to the forward base line 74B. The locations of the base lines are measured from the X axis as shown by the dimensions A and B and, in the machine herein disclosed, are located 70 inches from the X axis.

In order to enable a cut of variable depth to be effected by the cutter 66, as the cross slide moves along the beam, an electrohydraulic tracer 75 (FIG. 1) is provided for controlling the depth of cut in accordance with the profile of a template which is followed by the tracer finger 90 as the cross slide moves along the beam. As best seen in FIGS. 2, 4, and 5, a template bridge 76 is supported on the beam 37 and extends longitudinally therealong. On top of the bridge 76 is mounted a template holder 77 in which are clamped, side by side, a plurality of templates 78. Each template is in the form of a flat metal strip which is profiled along its upper edge to correspond to the depth of cut required for each cut made in the workpiece by the cutter 66. Hence, as the cross slide moves along the beam, the finger 90 of the tracer 75 will travel along the upper edge of a selected template and, through suitable servomechanisms hereinafter to be described, control the vertical movement of the spindle carrier 62 as the cutter moves over the workpiece.

As shown in FIG. 2, the tracer is mounted on a saddle 80 which is slidable along ways 81 provided on the cross rail 53 so as to permit the tracer to be indexed from one template to the next as the different cuts are made by the cutter in accordance with various settings of the gantries.

Referring to FIGS. 2 and 6, it will be observed that the tracer 75 is carried by a slide 85 which is movable along vertical ways 86 provided on the saddle 80. Vertical movement of the slide 85 along the ways 86 is effected by a hydraulic motor 87 which drives a lead screw 88 that meshes with a nut carried by the slide 85. The motor 87 forms part of a servomechanism controlled by the tracer for causing the tracer and the slide 85 to follow the contour of the template 78 being traced by the finger 90 of the tracer. Movement of the spindle carrier 62, which is effected by a hydraulic motor 92 (FIG. 1) operating a lead screw 93 engaging with a nut in the carrier, is caused to follow the movement of the tracer slide 85 by means of another servomechanism hereinafter to be described.

Indexing movement of the tracer saddle 80 along the cross rail 53 is effected by a hydraulic motor 94 (FIG. 6) which drives a lead screw 95 which meshes with a nut carried by the saddle. The pitch of the lead screw 95 is such that for each revolution thereof, the tracer finger 90 will be stepped from one template to the next.

The construction of the swivels 35 and 36 which are provided on the left hand and right hand gantries, respectively, and serve to support the ends of the beam 37 thereon, may be better understood by referring to FIG. 8 of the drawings which shows the construction details of the left hand swivel 35. As herein shown, the swivel is pivoted on the gantry by means of a trunnion 100 which is fastened in an upright position on the gantry 33. The upper end of the trunnion is threaded to receive a nut 101 which retains the inner race of a roller bearing 102 in place on the trunnion, the outer race of the bearing being held in a bore 103 provided in the swivel 35. The downward thrust exerted by the beam on the swivel is carried by a series of rolls 104 which run in a circular raceway provided in the meeting faces of the swivel and the gantry 33. This load of the beam is also shared by a plurality of rolls 105 journaled on axles 106 (only one shown) carried by the swivel. The rolls 105 ride in a semi-circular raceway provided between the swivel and the gantry. The swivel 36 is correspondingly fashioned whereby the ends of the beam 37 may swivel freely upon the gantries, the left hand end of the beam being slidably mounted on the swivel 35 by means of a pressure shoe 107 which rests upon the wear blocks or ways 39 carried by the swivel 35.

The template bridge 76 which rests on top of the beam 37 and provides support for the template holder 77 and templates 78 is so constructed as to permit any sag occurring in the beam between its end supports to be removed so as to provide a straight, flat support for the templates. Hence, the cutter will be caused to move parallel to the bed 30 when a straight template is followed by the tracer. Even though the cross slide 50 and cross rail 53 (FIG. 2) will follow any sag in the beam, the tracer slide will be controlled by the template and caused to move in a horizontal line from one end of the beam to the other.

The sag of the beam 37 is removed from the template bridge 76 by means of a truss construction which is best shown in FIG. 9 of the drawings. The truss structure is formed by a pair of tension bars 110, each provided with screw threads on either end thereof. The bars 110 extend diagonally downward from each end of the template bridge and pass through apertures provided therefor in the bridge and in the top and bottom plates of the beam 37. At their lower ends, the bars are threaded into tapped holes provided in blocks 111 which are fastened to opposite ends of a strap 112. The bottom of the bridge 76 is supported at two points on the strap 112 by means of screw jacks which may be adjusted to vary the spacing between the strap 112 and the bottom plate of the bridge. As shown, each screw jack is comprised of a screw 113 fastened at its upper end to the bottom of the bridge and threaded into an adjusting nut 114 at its lower end. Each nut is shouldered on its lower end and provided with a hexagonal tenon 122 formed integrally therewith. The tenon extends through apertures provided in the strap and in a pressure block 123 attached to the upper surface of the strap. The shoulder of each nut rests on the pressure block 123 and thereby transmits the weight of the bridge to the strap 112 at two points intermediate the length of the bridge.

Each bar 110 is fitted at its outer end with a draw nut 124 to permit initial tensioning of the strap 112. The bridge is adjusted to remove any sag occurring therein due to the sag in the beam 37 by applying a wrench to the hexagonal tenons 122 on the nuts 114 and screwing the nuts down on the screws 113 to elevate the central portion of the bridge and remove the sag therefrom. In this way the bridge may be adjusted until a straight edge template is brought into horizontal alignment throughout its length, thereby preventing any error from occurring in the depth of cut due to sag in the beam.

To permit the above-described adjustment to be made in the template bridge, it is necessary that some slippage be permitted between the bottom of the bridge and the top plate of the beam on which it rests. For this purpose, the template bridge 76 is made fast to the beam at its right hand end by means of pins 108 whereas the left hand end of the bridge is keyed to the beam by means of a horizontal key 109. Hence, the left hand end of the bridge may move longitudinally with respect to the beam but will be prevented from partaking of any lateral or sidewise movement thereon.

Figure 10:
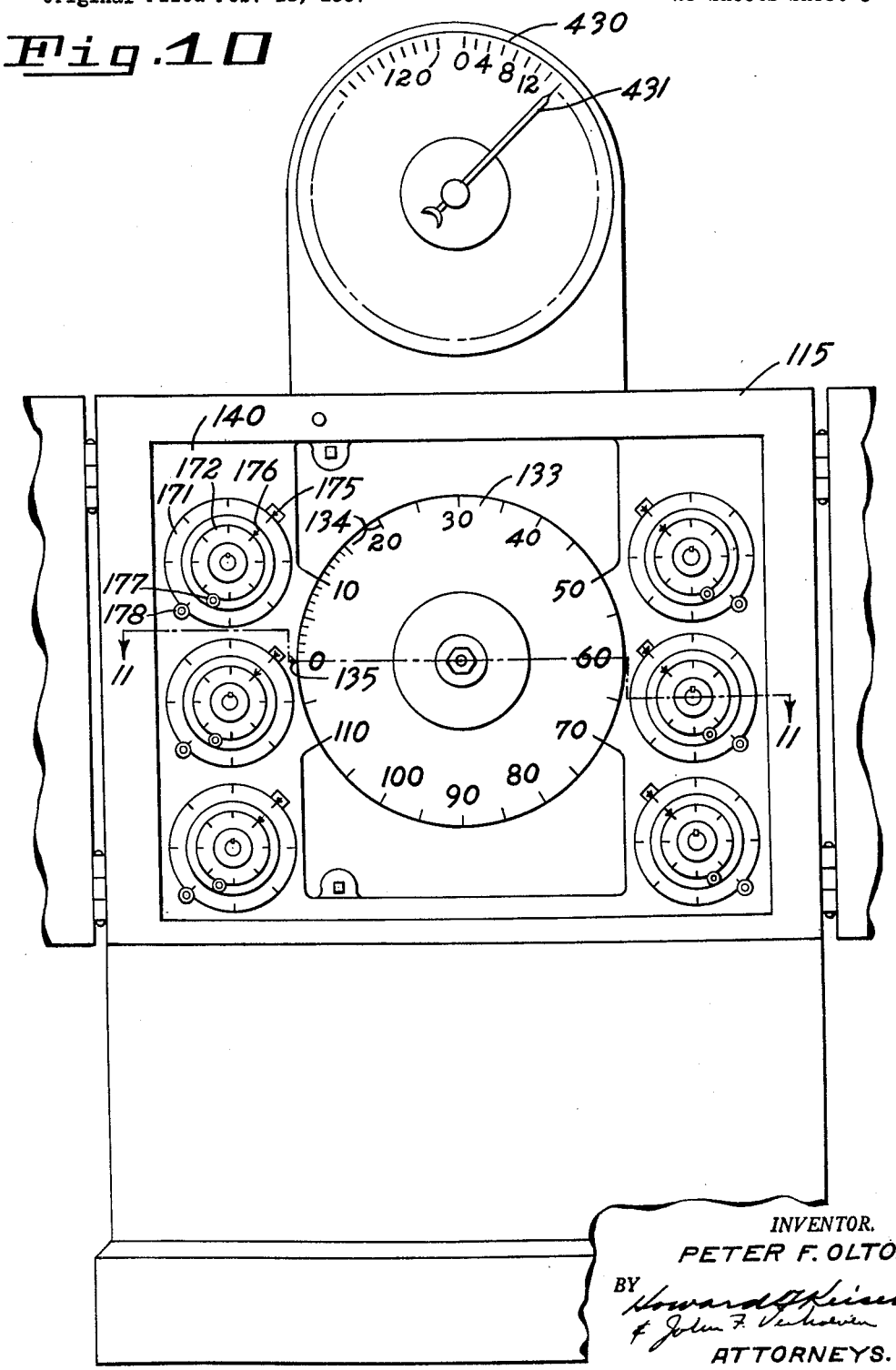
FIG. 10 is a front elevation of the gantry cam indexing mechanism.

As hereinbefore indicated, the present machine is provided with a data storage means for providing information regarding the various positions to be assumed by the gantries for each cut to be made in the workpiece by the cutter 66. This mechanism is contained in a cabinet 115 (FIGS. 4 and 10) which is located adjacent the operator's station in front of the left hand gantry 33. In the present embodiment of the invention, the data storage means comprises two sets of notched discs or cams, there being one set of three cams 116 (FIG. 11), 117 and 118 for the left hand gantry and a second set of cams 119, 120, and 121 for the right hand gantry. Each set of cams controls a triple speed synchro-transmission for controlling the positioning of its respective gantry. In the present apparatus the cam 116 controls the fine synchro, the cam 117 controls the medium synchro, and the cam 118 controls the coarse synchro for the left hand gantry system, while the cam 119 controls the fine synchro, the cam 120 controls the medium synchro, and the cam 121 controls the coarse synchro for the right hand gantry system. As shown in FIGS. 7, 11, and 12, each cam is of circular construction and is provided on its periphery with a series of notches, these being numbered 125, 126 and 127 for the fine, medium, and coarse cams 116, 117, and 118 for the left hand gantry. Corresponding notches are, of course, provided on the cams 119, 120, and 121 for controlling the positioning of the right hand gantry. Each set of cams is stacked, as shown in FIG. 11, and both sets are secured to a hub 128 by means of pins 129 and screws 130 which pass through flanges 131 and 132 formed integrally with the hub. The left hand gantry cams 116, 117, and 118 also carry a cover plate or disc 133 which, as shown in FIG. 10, is provided with indicia 134 which cooperate with an index 135 so as to show the rotational positions of the cams at all times.

The hub 128 is keyed on the end of a shaft 138 and is held in place thereon by a bolt 139 (FIG. 11). The shaft 138 is journaled for rotation in a frame casting 140 by means of ball bearings 141 and 142. A worm wheel 143 is keyed to the opposite end of the shaft 138 and is held in place thereon by a nut 144. Meshing with the worm wheel 143 is a worm 145 fast on a shaft 147 which is suitably journaled for rotation in the frame casting 140, and is adapted to be driven by a hydraulic motor 146 (FIG. 12). When the hydraulic motor is energized, the shaft 138 will be turned and the cam assembly thereby indexed from one position to another to bring the various notches on the cams into operative position.

Each of the gantry cams has associated therewith a sensing finger for feeling off the depth of the notches in the cam to thereby control the positioning of the gantries. As shown in FIGS. 7, 11, and 12, the fine, medium, and coarse cams 116, 117, and 118 for the left hand gantry have associated therewith sensing fingers 150, 151, and 152, respectively. Likewise, the fine, medium, and coarse cams 119, 120, and 121 for the right hand gantry have associated therewith the fingers 153, 154, and 155, respectively. Each sensing finger comprises a hollow bar 156 which is mounted for reciprocatory sliding movement in a bore provided therefor in the frame casting 140. The axis of each bar lies in the plane of its associated cam and is radially disposed with respect to the cams. The bars are each fitted at their inner ends with a sensing finger 157 which is of hollow tubular construction and provided on its end with a flat contact surface 158 which is adapted to seat against the bottoms of the notches in its associated cam. Received within each sensing finger is a limit switch actuating plunger 159 which is mounted for axial sliding movement within the finger and within the bar 156. As shown in FIGS. 11 and 12, the outer ends of the plungers are adapted to operate limit switches 160 carried by brackets 161 fastened on the ends of the bars 156. The limit switches 160 are normally open when the sensing fingers are moved out of contact with the cams but are adapted to be closed by the plungers 159 when the fingers engage the bottoms of the notches provided in the cams.

Each of the bars 156 is provided with rack teeth 165 (FIGS. 11 and 12) which mesh with the teeth of a spur gear 166 which is fast on one end of a shaft 167 journaled in the frame casting 140. The shaft 167 has secured thereto at its opposite end a gear 168 which meshes with a companion gear 169 which is fast on the end of a tube 170 also journaled in the frame casting 140. At its opposite end, the tube 170 has keyed thereto an outer dial 171 which lies against the forward face of the frame casting 140. Superimposed on the dial 171 is an inner or cutter compensation dial 172 which is concentric with the dial 171 and, as shown in FIG. 11, is keyed to a synchro-drive shaft 173. This shaft extends through the tube 170 and, at its rear end, is connected to the rotor shaft of a synchro-transmitter 174 mounted on the rear of the frame casting 140. The outer dial 171 is provided with indicia which, as shown in FIG. 10, cooperate with an index 175 carried by the casting 140 so as to indicate the angular position of the dial 171. In a similar manner, the inner or compensation dial 172 is provided with indicia which cooperate with an index 176 inscribed on the surface of the outer dial 171 so as to indicate the angular position of the inner dial with respect to the outer dial. The two dials may be clamped together for conjoint rotation by means of a clamping nut 177 (FIG. 10) while the outer dial 171 may be prevented from rotation with respect to the casting 140 by means of a clamping nut 178.

The sensing fingers are urged inwardly toward the notches in the cams by means of torsion springs 180 which surround the shaft 167 (FIGS. 11 and 12) and urge the shaft to rotate in a direction such as to move the bars 156 and sensing fingers 157 inwardly toward the cams. It will be noted from the foregoing description that by unclamping the outer dial 171 and clamping the inner dial 172 to the outer dial that when the fingers are allowed to move inwardly into contact with its associated cam, the rotor of the associated synchro transmitter 174 will be caused to assume an angular position corresponding to the depth of the notch in the cam.

It will also be observed that by adjusting the position of the inner dial 172 with respect to the outer dial 171, the angular position of the synchro-rotor may be adjusted with respect to the setting of the outer dial and with respect to the depth of the notch sensed by the sensing finger 157. This adjustment is provided to enable compensation to be dialed into the gantry control mechanism to compensate for any deviation of the centerline of the cutter from the line connecting the pivots of the swivels 35 and 36 (FIG. 3).

Means is provided for simultaneously removing all of the fingers from the cams so as to permit the latter to be indexed from one position to another, after which the fingers may again be lowered, simultaneously, into contact with the cams to again read off the information provided by the notches therein. As shown in FIGS. 11 and 12, this means comprises a pair of reciprocating slides 185 and 186 each of which is provided with three pick-up fingers 187 which are adapted to engage with cranks 188 provided on each of the shafts 167 so as to rotate the shafts against the urgency of the torsion springs 180 and remove the fingers from the cams. The slides 185 and 186 are connected for simultaneous operation by means of a shaft 190 (FIG. 12) which has fast thereon spur gears 191 and 192 which mesh with rack teeth 193 and 194 provided on the slides 185 and 186, respectively. The shaft 190 also has fast thereon a spur gear 195 which meshes with a rack 196 which is connected to the piston 197 of a hydraulic cylinder 198. Opposite ends of the cylinder are connected by hydraulic lines 200 and 201 with the motor ports of a solenoid operated valve 202 having a spool 203 which is normally held in a centered or neutral position by springs 204 and 205 acting on opposite ends of the spool. However, upon energization of the solenoids $SOL_1$ or $SOL_2$, the spool may be moved against the urgency of the springs to energize the hydraulic motor 198 in one direction or another. The pressure port of the valve 202 is connected by a hydraulic line 206 to a source of pressure provided by a pump 207. The exhaust ports of the valve are connected by a line 208 to sump 209. The manner in which solenoids $SOL_1$ and $SOL_2$ are energized to operate the motor 198 to either raise or lower the fingers will be described in a subsequent portion of this specification.

The shaft 190 also carries a cam 210 (FIGS. 12 and 13) which is provided with abutment faces 211 and 212 that cooperate with the toggle lever 213 of a limit switch LS2. When the fingers are down as shown in FIG. 12, the limit switch will be in the position shown in FIG. 13 and will remain in this position until the fingers are raised, whereupon clockwise movement of the cam will cause the face 211 on the cam 210 to throw the toggle of the switch toward the left as viewed in FIG. 13 when the fingers are fully raised. When the fingers are again lowered onto the cams, the cam 210 will turn counterclockwise and the switch 213 will be operated by the face 212 when the motor 198 reaches the end of its stroke to return the toggle 213 to the position shown in FIG. 13.

The hydraulic motor 146 which drives the gantry cams through shaft 147 and worm 145 is adapted to be selectively energized by a solenoid valve 215 which has its motor ports connected by hydraulic lines 216 and 217 with the motor 146. The pressure port of the valve 215 is connected by the line 206 with the source of pressure 207 while the exhaust ports of the valve are connected by the line 208 with sump 209. Hence, the motor may be energized and caused to rotate in one direction or the other by energization of $SOL_3$ or $SOL_4$ to bias the plunger of valve 215 in one direction or the other.

As further illustrated in FIGS. 11 and 12, the fine synchrocam 119 is provided with a depending cam projection 220 which is adapted to cooperate with a plunger 221 associated with a limit switch LS5. The cam 119 also carries a second cam projection 222 spaced inwardly from the projection 220. The projection 222 is adapted to cooperate with a plunger 223 associated with a limit switch LS4 to cause this switch, which is normally closed, to be opened in the last index position of the cams. As shown in FIG. 12, the cams are in their "0" positions in which the projection 220 holds the normally closed limit switch LS5 open, but will permit it to close upon indexing of the cams to their "1" positions.

As mentioned earlier herein, each gantry is provided with a drive box containing a hydraulic drive motor and the gearing for connecting the motor to the pinion which drives along the rack affixed to the bed of the machine. In FIG. 14 of the drawings there is shown the drive box 43 for the left hand gantry and the hydraulic circuitry associated therewith for controlling the hydraulic drive motor. It will be understood that a similar hydraulic circuit and driving mechanism is provided for the right hand gantry of the machine.

As shown in FIG. 14, there is provided a hydraulic motor 225 which drives a shaft 226 carrying a helical gear 227 which meshes with another helical gear 229. The gear 229 meshes with a gear 230 which drives a gear 231 which is fast on the same shaft as the pinion 44 which meshes with the rack 45 fastened to the bed 30. The motor shaft 226 also carries a spur gear 232 which meshes with a gear 234 fastened on a shaft 235 which is connected to the rotor of a synchroreceiver CT6. The shaft 235 also drives, through reduction gears 236 and 237, a shaft 238 which is coupled to the rotor of a synchroreceiver CT7. Likewise, the shaft 238 carries a small gear 239 which meshes with a larger gear 240 fast on a shaft 241 which is coupled to the rotor of a synchroreceiver CT8. By virtue of the speed reduction effected by gears 236, 237, and 239, 240, the synchroreceiver CT7 will rotate at a slower speed than the synchroreceiver CT6, and the synchroreceiver CT8 will revolve at a slower speed than the synchroreceiver CT7. Hence, the receiver CT6 may be referred to as the "fine" synchro, the receiver CT7 as the "medium" synchro, and the receiver CT8 as the "coarse" synchro.

The drive box 43 also has supported thereon by means of brackets 243 and 244 limit switches LS16 and LS17 which are adapted to be operated by abutment elements 245 and 246 mounted on the rack 45.

The hydraulic motor 225 is adapted to be controlled by an electrohydraulic valve 250 which is adapted to be biased by the application of a D.C. current applied to the input leads 251 which connect with the torque coils of the valve in a known manner to reciprocate the plungers 252 and 253 in opposite directions. As illustrated herein, the plungers 252 and 253 are slidably received in bushings 254 and 255 which, in turn, are slidably received in bores provided in a valve body 256. Each bushing is provided with an annular exhaust port 257, an annular pressure port 258, and a cylindric motor port 259. Hydraulic fluid under pressure is supplied to the pressure port 258 through a hydraulic line 260 which is connected to a source of pressure such as pump 261. The exhaust port 257 is connected through a line 262 to the sump 263. The valve body 256 is interdrilled, as shown, to provide communication between the pressure and exhaust ports in the bushings 254 and 255.

The motor ports 259 are connected by lines 264 and 265 to the ends of a valve 266 which is fitted with a plunger 267 which is biased to a neutral position by compression springs 268 and 269. Accordingly, as the plunger 252 is lifted, and the plunger 253 lowered, the line 265 will be connected to pressure, and the line 264 will be connected to exhaust, thereby causing the plunger 267 to move toward the left. As the plunger moves, it moves a crosshead 270 to the left also. The crosshead is pivoted on the lower end of a T-shaped rocker 271 which is pivoted at 272. The rocker carries a pair of rollers which lie beneath the ends of a pair of pivoted levers 273 and 274. The levers carry projections which bear against the lower ends of sleeves 254 and 255 which are urged downwardly into engagement therewith by springs 275. Accordingly, as the plunger moves to the left, the sleeve 254 will be raised, and the sleeve 255 will be lowered, thereby following up the movement of the plungers 252 and 253 and cutting off the ports so as to stop further movement of the valve plunger 267. Upon reverse movement of the plungers 252 and 253, the valve 267 will be shifted to the right and stopped by the followup action of the sleeves 254 and 255. The pressure port of valve 266 is connected through lines 280, 281, and 282 to the line 260 which connects to the pump 261. The exhaust ports of the valve 266 are connected by a line 283 with the line 262 which empties into the sump 263. The motor ports of valve 266 are connected by lines 284 and 285 to the hydraulic motor 225 and thereby control the direction and rate of actuation of the motor in accordance with the magnitude of the differential current applied to the input leads 251 of the valve 250.

Inasmuch as the quantity of oil which can be handled by the valve 250 is limited, and since it is desirable to move the gantries in rapid traverse until they approach their final positions, a high rate valve 290 is connected in parallel with the valve 250 through lines 291 and 292 connected to the motor ports of the valve 290. The exhaust ports of the valve are connected through a line 293 with the line 262 which communicates with the sump 263.

The valve 290 is, in turn, controlled by a solenoid operated valve 295 which has its motor ports connected by lines 296 and 297 to the ends of the valve 290. The exhaust ports of the solenoid valve are connected with the exhaust line 262 through a line 298. The plunger of solenoid valve 295 is normally held in its central position by means of centering springs 299 provided at either end thereof but may be shifted in either one direction or the other by energization of solenoids $SOL_{13}$ or $SOL_{14}$. This will cause pressure to be supplied to one end of the plunger of valve 290 and connect the other end of the valve to drain so as to shift the plunger in opposition to the force provided by centering springs 300 and cause a large volume of oil to be supplied to the motor 225 from the pump 261.

Figure 15:
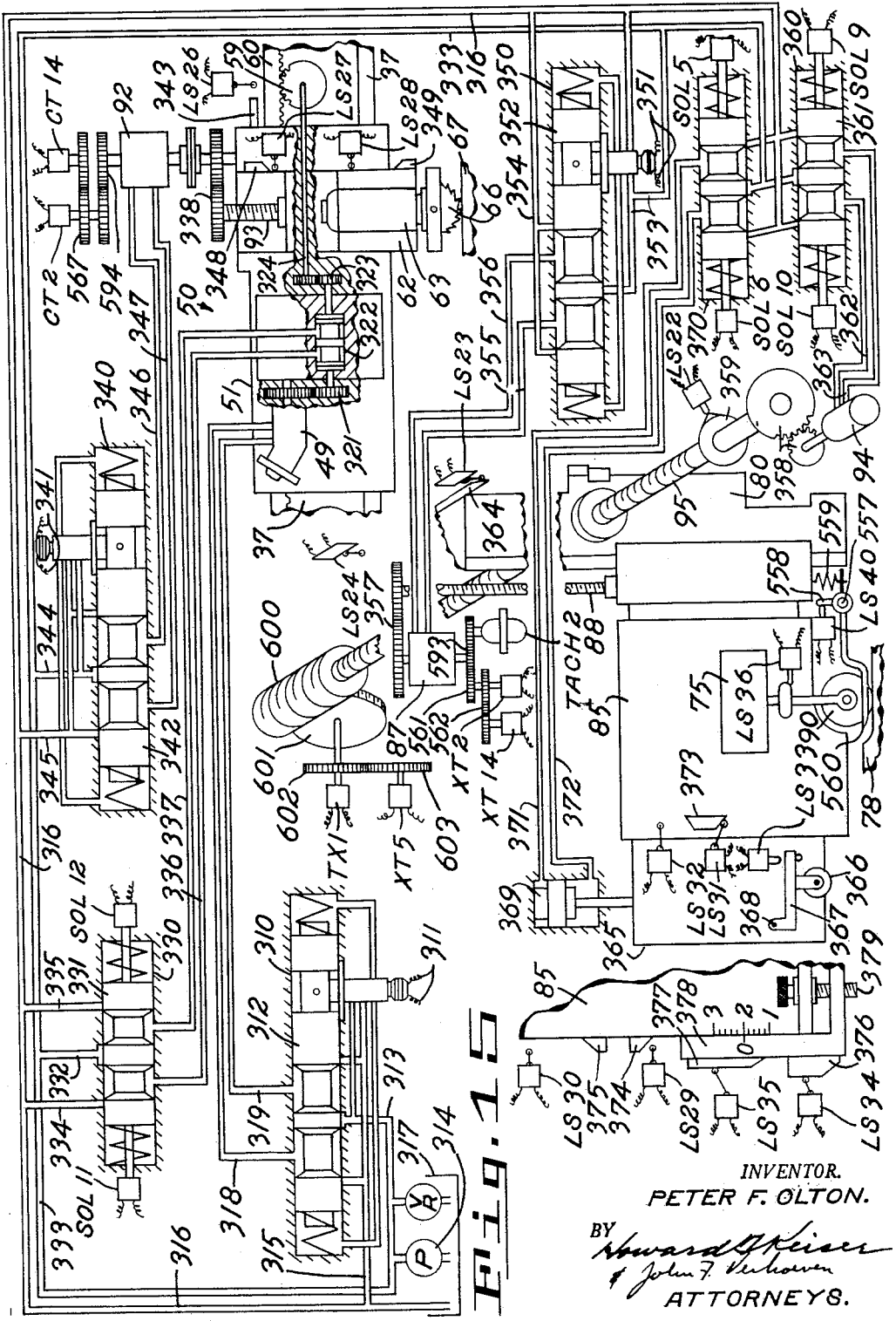
FIG. 15 is a hydraulic diagram of the cross slide, spindle carrier, and tracer driving mechanisms.

As earlier mentioned herein, a hydraulic drive mechanism is provided for moving the cross slide 50 along the beam 37 to feed the cutter along the workpiece and to return the cross slide at the end of the cut. The mechanism for effecting this movement of the cross slide is shown in FIG. 15 of the drawings. As there shown, there is provided an electro-hydraulic valve 310 which is similar to the valve 250 (FIG. 14) and, like the previously described valve, is provided with torque coils to which current is supplied through input leads 311. Thereby, plunger 312 is displaced in one direction or the other whenever a differential D.C. current is applied to the leads 311. The pressure port of the valve 310 is connected by a hydraulic line 313 with a source of pressure such as pump 314, and the exhaust ports of the valve are connected by a line 315 with a drain line 316 which returns the hydraulic fluid into a sump 317. The motor ports of the valve 310 are connected by lines 318 and 319 with a hydraulic motor 49 mounted on the front saddle 51 of the cross slide. The motor 49 is connected through gearing 321 to a hydraulically operated clutch 322 and from thence through gearing 323 to a shaft 324 on which is mounted the pinion 59 which meshes with the rack 60 extending along the beam 37. The clutch 322 is of conventional design and is effective in one position to connect the motor 49 with the pinion 59 at a predetermined gear ratio for effecting a tracing feed rate of the cross slide along the beam, and in another position to connect the motor with the pinion at a different gear ratio to provide rapid traverse movement of the cross slide along the beam. The clutch is adapted to be shifted to either one of these two positions by means of a solenoid valve 330 having a plunger 331 which is adapted to be shifted in either direction from its neutral position by solenoids $SOL_{11}$ and $SOL_{12}$. The pressure port of the valve is connected by a line 332 with a fluid pressure line 333 which is connected to the pump 314. The exhaust ports of the valve are connected by lines 334 and 335 with the drain line 316. The motor ports of valve 330 are connected by lines 336 and 337 with the clutch 322 and serve to operate the clutch in one direction or the other in correspondence with shifting of the valve by the solenoids $SOL_{11}$ and $SOL_{12}$. Movement of the cross slide to the right is limited by a normally open limit switch mounted on the beam which is adapted to be closed by an abutment 343 on the cross slide.

As previously stated, vertical movement of the spindle carrier 62 on the cross slide is effected by a hydraulic motor 92 which rotates a feed screw 93 engaging with a nut carried by the carrier 62. As shown in FIG. 15, the motor 92 is connected to the feed screw 93 by means of drive gears 338. The direction and rate of rotation of the motor 92 is controlled by an electro-hydraulic valve 340 which may be similar in construction and operation to the valve 250 (FIG. 14). Accordingly, when a differential D.C. current is applied to the input leads 341 of the valve, the plunger 342 thereof will be shifted in a direction corresponding to the polarity of the current applied to the input leads 341 and to an extent depending upon the magnitude of the current flowing through the torque coils of the valve. The pressure port of the valve is connected by a line 344 with the fluid pressure line 333 while the exhaust ports thereof are connected through a line 345 to the same line 316. The motor ports of the valve are connected through a lines 346 and 347 to the motor 92 and thereby control the rate and direction of rotation of the motor and of the spindle carrier 62. The range of movement of the spindle carrier is limited by a pair of normally closed limit switches LS27 and LS28 mounted on the front saddle 51 which cooperate with a pair of spaced dogs 348 and 349, respectively, provided on the carrier 62.

The drive mechanism for the tracer 75 is likewise shown in FIG. 15 of the drawings. It will be recalled that the tracer 75 is mounted on a slide 85 which is guided for vertical movement on the saddle 80 which is arranged for horizontal travel along the cross rail 53 of the cross slide. Also, as previously described, vertical movement of the slide 85 is effected by a hydraulic motor 87 which drives a feed screw 88 that meshes with a nut carried by the slide. As shown in FIG. 15, the motor 87 is controlled by an electro-hydraulic valve 350 which may be similar in character to the valve 250 shown in FIG. 14. As herein indicated, the valve 350 is provided with input leads 351 by means of which a differential D.C. current may be applied to the torque coils of the valve to shift the plungers of the pilot valve and thereby effect displacement of the plunger 352 of the main valve. The pressure port of valve 350 is connected by a line 353 with the fluid pressure line 333 while the exhaust ports of the valve are connected by a line 354 with the drain line 316. The motor ports of the valve are connected by lines 355 and 356 with the hydraulic motor 87 and thereby control the rate and direction of movement of the slide 85 on the saddle 80 through gears 357 which connect the motor to the lead screw 88.

In FIG. 15 is also shown the hydraulic motor 94 which acts through drive gears 358 to rotate the lead screw 95 and thereby traverse the saddle 80 across the cross rail 53 to provide indexing movement of the tracer from one template to the next. As further shown in this figure, the lead screw has mounted thereon a cam 359 which actuates a limit switch LS22 for a purpose hereinafter to be described. Operation of the motor 94 is controlled by a solenoid valve 360 having a plunger 361 which is adapted to be shifted in either direction from the neutral position shown in FIG. 15 by means of energization of solenoids $SOL_9$ or $SOL_{10}$. As herein shown, the pressure port of the valve is communicatively connected with the pressure line 333 whereas the exhaust ports thereof are connected to the drain line 316. The motor ports of the valve are connected by lines 362 and 363 with the hydraulic motor 94 to effect control of the motor by the solenoid valve. When the tracer is in its starting position over the "0" template, a normally open limit switch LS23 mounted on the cross rail 53 is held closed by an abutment 364 on the saddle 80. When the tracer is in its last position over the $n+1$ template, a normally closed limit switch LS24, likewise mounted on the cross rail 53, is held open by the abutment 364.

As also shown in FIG. 15, the slide 85 has mounted thereon for vertical sliding movement a slide 365 which carries a rapid traverse stop roller 366 mounted on an arm 367 pivoted at 368 on the slide 365. The slide 365 is adapted to be raised or lowered on the slide 85 by means of a hydraulic cylinder or motor 369 mounted on the latter slide. This motor is controlled by a solenoid valve 370 having a plunger which is operable by the solenoids $SOL_5$ and $SOL_6$. The pressure port of the valve is connected to the pressure line 333 while the exhaust ports of the valve are connected to the drain line 316. The motor ports of the valves are connected by lines 371 and 372 to the upper and lower ends, respectively, of the motor 369. Accordingly, the rapid traverse stop roller slide 365 may be raised or lowered by energization of solenoids $SOL_5$ and $SOL_6$, respectively.

The slide 365 has mounted thereon a pair of normally open limit switches LS31 and LS32 which are arranged to cooperate with a dog 373 fast on the tracer slide 85. When the roller 366 is in its raised or inactive position, as shown in FIG. 15, the limit switch LS31 is held closed by the dog. Conversely, when the roller is moved down to its active position, the limit switch LS31 is released and the limit switch LS32 closed by the dog.

Tripping of the stop roller 366 is sensed by a normally closed limit switch LS33 mounted on the slide 365 with its plunger in contact with the arm 367 as shown in FIG. 15. Accordingly, when the roller 366 is contacted by the abutment 622, the arm 367 will be raised and the limit switch LS33 opened, thereby terminating the rapid traverse return of the cross slide.

Vertical movement of the tracer slide 85 on the saddle 80 is adapted to operate limit switches LS29, LS30, LS34 and LS35 which are supported on the saddle for cooperation with dogs 374, 375, 376 and 377, respectively. Limit switches LS29 and LS30 are safeties for limiting the range of movement of the tracer on the saddle in its downward and upward movements thereon, respectively. Limit switches LS34 and LS35 are utilized to control the automatic cycling of the machine in a manner hereinafter to be described. As shown in FIG. 15, the dog 376 and 377 for operating these limit switches are mounted on a bracket 378 which may be adjusted relative to the slide 85 by a thumb screw 379. The position of the bracket on the slide is indicated by a scale as shown in FIG. 15. The indicia of the scale indicate the work line, i.e., the top edge or upper surface of the workpiece. In setting up the machine, the bracket is adjusted until the reading of the scale corresponds to the thickness of the workpiece.

*Block Diagrams*

In the beam miller herein shown and described, the gantry and tracer index mechanisms are operated at the end of each cut and before the beginning of the next cut so as to adjust the positioning of the gantries as required and to move the tracer into alignment with the template corresponding to the new position of the gantries. The mechanisms which effect indexing of the gantry control cams and of the tracer at the end of each cut are indicated by blocks 380 and 381 shown in FIG. 17. The coordinated operation of these mechanisms is effected by the electrical control equipment hereinafter to be described, this synchronization of the mechanisms being represented on the drawing by the dotted line 382 connecting the blocks 380 and 381. As further illustrated by the block diagram, the gantry indexing device effects step-by-step positioning of the gantry control cams in the gantry control unit 115 (FIG. 10) which, in turn, determine the positions to be assumed by the left hand and right hand gantries 33 and 34, respectively, preparatory to effecting the next cut in the workpiece. At the same time, the tracer indexing device 381 causes the tracer 75 to be stopped over to the next template whereby the cutter 66 will be controlled in its up and down movements on the cross slide by the tracer in accordance with the contour of the template as the tracer and cutter move with the cross slide over the workpiece.

The manner in which the left hand and right hand gantries are accurately positioned along the ways provided therefor on the bed of the machine is illustrated by the block diagram shown in FIGS. 16A and 16B. As previously described, and as shown in the diagram (FIG. 16A), the gantry index motor 146, through a mechanical connection represented by the line 385, positions the fine, medium, and coarse synchro-control cams 116–118 and 119–121 for the left hand and right hand gantries, respectively. The synchro-transmitters XT6, XT7, and XT8 controlled by the left hand gantry cams, and the synchro-transmitters XT9, XT10, and XT11 controlled by the right hand gantry cams are electrically connected with the corresponding synchro-receivers CT6–CT11 (FIG. 16B) on the gantries. The lines 386, 387, and 388 on the block diagram represent the conductors leading from the transmitter synchros for the left hand gantry to the receiver synchros CT6, CT7, and CT8, on the left hand gantry, while the lines 390, 391, and 392 represent the conductors leading from the transmitter synchros for the right hand gantry to the receiver synchros CT9, CT10, and CT11 on the right hand gantry. The signals produced by the two groups of synchro-receivers are transmitted by conductors 393, 394, and 395 (FIG. 16B) to a left hand switching panel 396 (FIG. 16A), and by conductors 397, 398, and 399 to a right hand switching panel 400. The switching panels 396 and 400 function to select either the coarse, medium, or fine signal supplied thereto by the synchro-receivers and to deliver the selected signal to the corresponding left hand phase detector 401 or right hand phase detector 402. The phase detectors sense the phase of the signals and produce a plus or minus D.C. signal which is then amplified by power amplifiers 403 and 404. The amplified signals are utilized to control the electro-hydraulic valve 250 for the left hand gantry and a corresponding valve 405 for the right hand gantry. As previously described, and as shown in FIG. 14, these valves control the hydraulic motor 225 for the left hand gantry and a corresponding motor 406 for the right hand gantry. These motors drive the gantries 33 and 34 and also turn the rotors of the synchro-receivers so as to reduce the error signals produced thereby. When the error signals are reduced to zero, the gantries will cease to move and will then occupy the positions indicated by the notches on the cams.

As indicated in FIG. 16A, the high-rate solenoid control valve 290 (FIG. 14) for the left hand gantry, and the corresponding valve 407 for the right hand gantry, are activated under the control of the switching panels 396 and 400, respectively. As previously mentioned, these valves deliver a large volume of hydraulic fluid to the motors 225 and 406 and thereby effect rapid positioning of the gantries until they are within a certain distance of their final positions when the solenoid valves are deenergized. Thereafter, the gantries are brought into their final positions under the control of the electrohydraulic valves 250 and 405.

If desired, a hand wheel controlled synchro transmitter may be selectively connected with the fine synchro receiver for each gantry control system instead of the cam controlled fine synchro-transmitters XT6 and XT9 in order to permit end positioning of the gantries independent of the cam control. The hand wheel synchrotransmitters are indicated on the block diagram (FIG. 16A) by blocks XT6A and XT9A and, by the provision of suitable switching means, may be inserted in the circuit in place of the cam controlled synchros. Thereby, the gantry servo mechanisms will operate under the control of the handwheels to move the gantries in accordance with the rotation thereof by the operator of the machine.

The tracer, cross slide and spindle carrier servomechanisms are illustrated by the block diagram shown in FIG. 18. As herein illustrated, error signals produced by the tracer 75 are first passed through an error rate damping network 415, thence to a phase detector 416 which provides a plus or minus D.C. signal in accordance with the phase of the A.C. signal and delivers the D.C. signal to a power amplifier 417. After being amplified, the D.C. signal is applied to the torque coils of the electro-hydraulic transducer valve 350, which as previously described in connection with FIG. 15 of the drawings, controls the tracer hydraulic motor 87 to cause the tracer 75 to follow the contour of the template 78 being traced. As the tracer is adjusted up or down by the motor 87, the error signal produced thereby will be reduced, and so reduce the speed of motor 87 as the tracer is brought back to its neutral position.

The spindle carrier is caused to follow the movement of the tracer on the cross slide by the synchro drive mechanism illustrated in the lower portion of FIG. 18. As herein shown, the hydraulic tracer motor 87 drives a tachometer TACH2, a fine synchro transmitter XT2, and a coarse synchro transmitter XT14. The fine and coarse synchros are connected through differential hand wheel synchros XD2 and XD14 with synchro receivers CT2 and CT14. The signals from the synchro receivers are fed into a switching panel 420 which shifts the control from the coarse to the fine synchros as the error signal is reduced. The output from the switching panel is fed into a phase detector 421 which provides a plus or minus D.C. signal in accordance with the phase of the A.C. signal from the receiver synchros. The D.C. error signal is then amplified by power amplifier 422 and applied to the torque coils of the electro-hydraulic transducer or valve 340. As previously explained, this valve (FIG. 15) controls the operation of hydraulic motor 92 to move the spindle carrier 62 up and down on the cross slide 50. As illustrated in the block diagram (FIG. 18), the motor 92 also drives the fine and coarse synchro receivers CT2 and CT14 so as to cancel out the error signal when the position of the carrier corresponds to that of the tracer.

As shown in the upper portion of FIG. 18, the cross slide 50 is translated along the beam 37 by a servomechanism consisting of a phase detector 425 which provides a plus or minus D.C. signal in accordance with the phase of an A.C. signal supplied thereto. The D.C. output of the phase detector is amplified by a power amplifier 426, and the amplified D.C. signal is delivered to the torque coils of the electro-hydraulic transducer or valve 310 which, as previously explained in connection with FIG. 15, controls the operation of hydraulic motor 49 mounted on the cross slide which drives the pinion 59 along the rack 60 on the beam. Accordingly, when an A.C. feed rate or power feed signal is delivered to the phase detector, the electro-hydraulic valve 310 will be unbalanced and drive the motor in one direction or the other in accordance with the phase of the input signal. Provision is made for delivering either a low voltage feed rate signal or a higher voltage power feed signal to the phase detector to move the cross slide to the left or right respectively so as to provide left hand feeding movement of the cross slide during tracing and rapid traverse to the right at the conclusion of the cut. The feed rate signal is delivered to the phase detector from a source indicated by block 427 on the diagram while the power feed rate signal is provided by a voltage source indicated by block 428 thereon. When the error signal provided by the tracer head increases due to a rapid change in the contour of the template 78, the feed rate voltage is reduced by a slowdown circuit included in block 427 which is controlled, as indicated in the block diagram, by the signal from the tracer 75.

FIG. 19 is a block diagram illustrating the synchro drive for the dial 430 (see also FIG. 10) on the cabinet 115 which serves to indicate the position of the tracer over the templates. This device includes a torque synchro transmitter TX1 which, as shown in FIG. 15, is rotated by the tracer indexing mechanism, and a torque synchro-receiver TR1 which is located behind the dial 430 and drives the pointer 431 (FIG. 10) which indicates the number of the template over which the tracer is located at any particular moment during the machining cycle.

SERVOMECHANISMS

As hereinbefore indicated in the block diagrams, the present machine is provided with four feedback servomechanisms for effecting the positioning of the gantries, tracer, and spindle carrier, and with an additional servomechanism operating without feedback for moving the cross slide in either direction along the beam. The servomechanisms for the gantries are identical and, accordingly, only one of these will be described in detail.

Gantry Servos

The servomechanism for the left-hand gantry, as shown in FIG. 20, comprises the fine, medium, and coarse synchro transmitters XT6, XT7, and XT8. As mentioned previously, these are located in the cabinet 115 (FIG. 10) at the master control station and are independently positioned by the gantry cams. As shown in FIG. 20, the rotors of the synchro transmitters are connected to an alternating current source 440 through the conductors 441 and 442. As further shown in the drawing, the stators of the synchro-transmitters are connected to the stators of the corresponding control transformers or receivers through the contacts of relays 203CR, 203CRA, and 203CRB which function when the relays are energized to reverse the S1 and S3 leads of the synchro stators and thereby reverse the sense of the signals appearing in the leads of the rotors of the synchro-receivers. As will be more fully described in a later portion of the specification, this reversal of the synchros is utilized to permit parts of the opposite hand to be machined without changing the gantry control cams. It will be noted from the drawing, that the rotors of the synchro-receivers are geared together for conjoint rotation, the rotor of the fine synchro CT6 driving the rotor of the medium synchro CT7 at reduced speed through the gears 236 and 237, and the rotor of the medium synchro CT7 driving the rotor of the coarse synchro CT8 at a reduced speed through the gears 239 and 240. It is to be noted that no such gearing exists between the rotors of the synchro-transmitters XT6, XT7, and XT8, the rotors of these synchros being positioned independently under the control of the gantry cams.

In the right hand portion of FIG. 20 is shown a wiring diagram for the switching panel 396 (FIG. 16A) for the left hand gantry servomechanism. In this circuit, the signal voltages from the rotors of the receiver synchro are delivered to the input terminals of the phase detector 401 for the left hand gantry under the control of relays 1SWRA and 2SWRA, these relays being controlled by the amplitude of the signals from the medium and coarse synchro receivers respectively. When both relays are deenergized, the signal from the fine synchro receiver CT6 is delivered through a lead 455 and the closed contacts of relay 1SWRA to a junction 456. The other terminal of the rotor winding of synchro CT6 is connected to a ground lead 457. From the junction 456, the signal passes through the normally closed contacts of relay 2SWRA and lead 458 to a junction 459 which is connected by a lead 460 to the input of the phase detector 401 through the normally open contact of relay 201CR. The relay 201CR is energized when the gantry index fingers are down on the cams, thereby closing the normally open contact of this relay shown in FIG. 20, and connecting the signal to the phase detector 401. The relay 201CR is also provided with a normally closed contact which serves to short the input terminals of the detector 401 to ground when the fingers are up and the relay deenergized.

Upon the occurrence of a signal of considerable magnitude appearing across the terminals of the rotor of the coarse synchro receiver CT8, which will result whenever the gantry is displaced a considerable distance from the position indicated by the coarse gantry cam, the relay 2SWRA will be energized to switch the control from the fine synchro receiver CT6 to the coarse synchro receiver CT8.

As shown in FIG. 20, one lead from the rotor winding of the course synchro CT8 is connected by a conductor 463 with one terminal of the primary winding of a transformer 464, the other lead of the synchro being connected to ground lead 457. The opposite terminal of the primary winding of transformer 464 is connected to the ground lead 457 as is also one terminal of the secondary winding of the transformer 464. The other terminal of the secondary winding of the transformer is connected to the grid of a vacuum tube 465, the plate of which is connected through the primary winding of a transformer 466 and lead 467 to a positive D.C. voltage source. The secondary winding of the transformer has a center tap connected to the slider of a potentiometer 468. The end terminals of the secondary winding are connected to the grids of a pair of thyratron tubes 469 and 470, whose plates are driven from a 60 cycle A.C. source through a transformer 471. The grids of the thyratrons are provided with a variable negative bias from a source of negative D.C. voltage through a lead 472, potentiometer 468, and a resistor 473 to the cathodes of the thyratrons which are grounded through a lead 474. The secondary winding of the plate transformer 471 has a center tap which is connected through a resistor 475 and the coil of relay 2SWRA to the cathodes of the thyratron tubes. Hence, when the signal from the coarse synchro receiver CT8 is of sufficient magnitude to overcome the bias provided on the grids of the thyratrons by the potentiometer 468 and cause the tubes to fire, the relay 2SWRA will be energized. Thereby, the normally closed contacts of relay 2SWRA in line 458 will open and disconnect the fine synchro receiver from the input to the phase detector 401. At the same time, the contacts of relay 2SWRA which connect junction 459 with a junction 476 will be closed, thereby connecting the lead 463 from the coarse synchro receiver to the input lead 460 for the phase detector. Additionally, the normally open contacts of the relay 2SWRA connected around the resistor 473 will be closed, thereby shorting out this resistor and grounding the end of potentiometer 468. This will reduce the bias voltage on the grids of the thyratrons and maintain the relay energized with a somewhat smaller synchro signal than that which originally caused it to become energized.

As the gantry moves toward its preselected position, the signal from the coarse synchro receiver will be duced. When the gantry reaches a position in which the medium synchro receiver is somewhat less than 180 degrees away from correspondence, the relay 2SWRA drops out, and the relay 1SWRA, now being energized due to the large amplitude of the signal from the medium synchro-receiver, will close the normally open contacts 1SWRA, thereby connecting the rotor winding of the medium synchro receiver to junction 456 through lead 480. The signal from the medium synchro will thereby be transmitted through the normally closed contacts of relay 2SWRA and lead 458 to junction 459 and thence through lead 460 to the input terminal of the phase detector 401. At the same time, the normally closed contacts of relay 1SWRA in line 455 are opened so as to disconnect the fine synchro receiver.

The relay 1SWRA is caused to be energized upon the occurrence of a large signal in the rotor winding of the medium synchro receiver CT7 in the same manner that the relay 2SWRA was caused to be energized by the occurrence of a large signal in the rotor winding of the coarse synchro receiver. This means includes a lead 481 which connects the rotor winding of the medium synchro receiver CT7 to the primary winding of transformer 482. This transformer has a secondary winding connected to the grid of a vacuum tube 483 which amplifies the signal and delivers it to the grids of thyratron tubes 484 and 485. Negative bias is applied to the grids of the thyratrons from the negative voltage source through a lead 486, potentiometer 487, and resistor 488. The plates of the thyratrons are driven from the A.C. source through a plate transformer 489, the secondary of which is center tapped and connected through a resistor 490 and coil of relay 1SWRA to the grounded cathodes of the thyratron tubes. This relay has a contact 1SWRA connected across the resistor 488 so that this resistor will be shorted out when the relay is energized. Thereby, the bias on the grids of the thyratron tubes 484 and 485 will be reduced so that the relay will be maintained energized with a somewhat smaller signal from the medium synchro than that which originally caused it to become energized.

When the gantry reaches a position in which the fine synchro receiver CT6 is less than 180 degrees away from correspondence, the relay 1SWRA will drop out and thereby connect the fine synchro to the input of the phase detector. The dropout points of the relays 2SWRA and 1SWRA may be adjusted by the potentiometers 468 and 487.

The phase detector 401 rectifies the A.C. signals from the synchro receivers and produces either a positive or negative D.C. signal, depending on the phase of the input signal. The D.C. signal from the phase detector is amplified by the power amplifier 403 and delivered to the torque motor coils of the electro-hydraulic valve 250 through the coils of relays 213SR and 214SR. When a large error signal is delivered by the synchro receivers to the phase detector 401, an unbalanced current of considerable magnitude will flow from the power amplifier 403 through the coils of the torque motor. Accordingly, the current flowing through one of the relay coils 213SR or 214SR will be considerably greater than the normal current flow therethrough for a zero signal, while that flowing through the other relay coil will be considerably less than normal. This will cause one relay to be energized, and the other relay to remain deenergized, and thereby determine which of the solenoids 13SOL and 14SOL is to be energized. In this way the direction of movement of the rapid traverse valve 290 for the left hand gantry motor 225 is controlled in accordance with the phase of the error signal. It will be recalled that this valve is operated only when the gantry is more than a certain distance away from the final position indicated by the gantry cams and acts to override the electro-hydraulic valve 250 and deliver a large volume of hydraulic fluid to the gantry motor to move it rapidly toward its final position.

*Tracer Servo*

The tracer 75 (FIG. 15) has included therein a pickup comprised of an E transformer 500 (FIG. 21) having a longitudinally movable armature 501 to which is connected the tracer finger 90. The primary winding of the E transformer is excited with A.C. current from a suitable source 502. The transformer is also provided with a pair of secondary windings which are connected in series with one another and also with the primary winding of a transformer 503. The secondaries are wound in phase opposition so as to induce a voltage which is either in phase with the source 502 or 180 degrees out of phase therewith as the armature 501 is moved in one direction or the other from its neutral position. The transformer 503 has a secondary winding 504, one terminal of which is connected to an output lead 505 while the other terminal thereof is connected through the normally open contacts of a relay 106CRC to a ground lead 499. When the relay is deenergized as shown in FIG. 21, the output lead 505 is connected to the ground lead 499 through normally closed contacts of relay 106CRC while the other terminal of the transformer is left open by the normally open contacts of the relay. However, upon energization of the relay, the signal induced therein from the pickup will be transmitted by lead 505 to a potentiometer 506, the opposite end of which is connected to ground. The slider of the potentiometer is connected to the input of an error rate damping network comprised of resistors 507 and 508, and condensers 509 and 510. This network constitutes a bridged T network which tends to stabilize the system ad thereby permits greater sensitivity thereof. The values of the components of the network may be as follows for a 400 cps. input voltage to the pickup:

| | | |
|---|---|---|
| Resistor 507 | ohms | 51,000 |
| Resistor 508 | do | 8,200 |
| Condenser 509 | mf | .01 |
| Condenser 510 | mf | .04 |

The output lead 511 from the error rate damping network is connected through the normally open contacts of a relay 106CRA to the input lead 512 of the tracer phase sensitive amplifier 416. The other lead 513 of the phase sensitive amplifier is connected to ground, and the leads 512 and 513 are connected by a normally closed contact of relay 106CRA. Hence, when the relay is deenergized, the input leads of the phase sensitive amplifier are connected to ground so as to prevent any signal from reaching the amplifier 416. However, when the relay is energized, the signal from the tracer will be fed into the phase sensitive amplifier 416. The output leads of this amplifier are connected with the input leads of a D.C. power amplifier 417 which includes power output tubes whose plates are fed through the torque motor coils 514 and 515 of the electro-hydraulic valve 350 from a source of positive D.C. potential 516. As shown in the drawing, the coil 514 has shunted thereacross a resistor 517 and the normally open contacts of a relay 108CR. This relay is normally deenergized but, when energized, will reduce the current flowing through the coil 514 to thereby unbalance the electro-hydraulic valve for a purpose hereinafter to be stated.

*Cross Slide Servo*

As shown in FIG. 21, the cross slide servomechanism is supplied with an A.C. signal from a source 520. One side of the source is connected to the ground wire 519 while the other side is connected through a lead 521 to one terminal of the primary winding of a transformer 522, the other terminal of the primary winding being grounded as shown. One terminal of the secondary winding of this transformer is connected to ground while the other side is connected by a lead 523 to the input lead 524 of the cross slide phase detector 429 through the normally open contacts of a relay 113CR and the normally closed contacts of relay 106CRB. The A.C. signal is converted by the phase detector into a positive or negative D.C. voltage, depending upon the phase of the signal supplied thereto through the input lead 524. The D.C. output of the detector is then amplified in power amplifier 426 and applied to the torque motor coils of the electro-hydraulic valve 310. For a zero signal input to the phase detector 429, equal and opposite currents will flow through the two coils of the torque motor so that the valve will remain closed. However, when a D.C. voltage is applied to the amplifier 426 the currents flowing through the torque motor coils will be unbalanced in one direction or the other, depending upon the polarity of the D.C. voltage. Hence, when the relay 113CR is energized to close the normally open contacts thereof in FIG. 21, an A.C. signal will be delivered to the phase detector 429, thereby unbalancing the electro-hydraulic valve 310 and energizing the cross slide hydraulic motor 49 (FIG. 15). The signal thus delivered by the transformer 522 to the cross slide servomechanism is of suitable amplitude to operate the cross slide motor at such a speed as to provide a power feed rate of the cross slide 50. The secondary winding of the transformer 522 is so poled as to drive the cross slide toward the right as viewed in FIG. 1.

The A.C. source 520 is also utilized to provide a tracing feed rate voltage for the cross slide servomechanism. For this purpose, the supply lead 521 is connected to the primary winding of a transformer 528 through a normally closed limit switch 40LS which is shunted by a resistor 529. The transformer 528 is provided with a secondary winding which feeds the primary winding of a transformer 530. One terminal of the secondary winding of the transformer 530 is connected to the grid of a control tube 531 while the other terminal thereof is connected to a plate of a biasing tube 532. The tubes 531 and 532, together with a slowdown tube 533 comprise a slowdown circuit for reducing the tracing feed rate of the cross slide as the error signal produced by the pickup 500 increases.

As shown in the upper left hand corner of FIG. 21, the transformer 503 is provided with a secondary winding 535, one terminal of which is connected to a negative voltage source 536 while the other terminal is coupled by a condenser 537 to the grid of the slowdown tube 533. The plate of the latter tube is connected to ground while the cathode is connected through the primary winding of a transformer 538 to a conductor 539 connected to the negative voltage supply. The secondary winding of the transformer 538 is connected to a voltage doubler which includes rectifiers 540 and condensers 541 which are connected so as to render the lower end of a potentiometer 543 positive with respect to the upper end thereof, as viewed in FIG. 21, whenever an error signal is produced by the pickup 500. The upper or negative end of the potentiometer 542 is connected to the cathode of the biasing tube 532 through a cathode resistor 543. The grid of the tube is connected to the slider of the potentiometer through a resistor 544. The upper or negative end of the potentiometer 542 is also connected to the negative voltage supply lead 539 so that under zero signal conditions the grid is of the same potential as the lead 539 while the cathode is somewhat more positive due to the voltage drop in the resistor 543. The plate of the tube 532 is connected to the ground lead 519 through a resistor 547 and a rheostat 548. Hence, whenever an error signal is produced by the pickup due to the displacement of its armature 501 out of its neutral position, the grid of tube 532 will be rendered more positive, thereby causing the plate to become more negative. Accordingly, the grid of control tube 531 will be rendered more negative by reason of its connection to the plate through the secondary of transformer 530 and lead 549. The cathode of the tube 531 is connected to ground lead 519 through a cathode resistor 550 which is shunted by a condenser 551. The plate of tube 531 is fed from a positive voltage source 552 through the primary winding of a transformer 553. The secondary winding of the transformer 553 has one terminal thereof connected to ground while the other terminal is connected to the upper end of a potentiometer 554. The slider of the potentiometer is connected through a normally open contact of a relay 107CRA and a normally open contact of a relay 107CR to the input lead 524 of the phase sensitive amplifier. Hence, the tracing feed rate signal which is supplied from the A.C. source 520 through transformers 528 and 530 to the tube 531 will be delivered through the transformer 553 and potentiometer 554 to the input lead 524 of the phase detector 429. The phase of the signal is such as to cause the cross slide to be driven toward the left as viewed in FIGURE 1. The amplitude of the signal will be reduced in accordance with the amplitude of the error signal produced by the pickup of the tracer by the slowdown circuit which applies a negative bias to the control tube 531 in accordance with the amplitude of the error signal. The tracing feed rate voltage may also be adjusted by potentiometer 554 to provide the desired feed rate of the cross slide along the beam.

The limit switch 40LS is normally held closed as shown in FIG. 21 by an anticipation finger 560 (FIG. 15) which is pivoted at 557 on the slide 85. Integral with the finger 560 is an arm 558 which is held against the plunger of the limit switch by a spring 559 so as to hold the normally open limit switch closed. As shown in FIG. 15, the anticipator finger 560 lies adjacent the tracer finger or roller 90 but extends somewhat ahead and behind the roller where it is provided with cam surfaces which are adapted to contact the surface of the template 78 in advance of the roller when a sudden rise or fall occurs thereon. Assuming in FIG. 15 that the cross slide is moving toward the left, the anticipation finger 560 will contact the rise shown on the template 78 in advance of the roller 90 and be cammed upwardly so as to release the limit switch LS40. When this occurs, the resistor 529 (FIG. 21) will be introduced into the circuit in series with the primary winding of transformer 528, thereby attenuating the feed rate signal derived from the source 520. The size of the resistor 529 is preferably such as to considerably attenuate the signal, thereby drastically reducing the speed of the cross slide to provide time for the tracer and spindle carrier to follow the contour of the template.

*Carrier Servo*

The servomechanism utilized for causing the spindle carrier to follow the movement of the tracer on the cross slide is shown in FIG. 23. A pair of synchro transmitters XT2 and XT14 are arranged to be driven by the hydraulic motor 87 (FIG. 15) which drives the lead screw 88 that feeds the tracer slide 85 up and down on the saddle 80. The synchro-transmitter XT2 is driven by the motor 87 through gears 561 while the synchro transmitter XT14 is, in turn, driven by the transmitter XT2 through gears 562. The gears 562 are of a suitable ratio to cause the transmitter XT14 to be driven at a lower speed than the transmitter XT2 so as to provide a double-speed synchro transmission in which the transmitter XT2 is the fine synchro and the transmitter 14 is the coarse synchro.

The rotor windings of the synchro transmitters are energized from an A.C. current source 563. The stators of the synchro transmitters are connected to the three-phase rotor windings of differential synchros XD2 and XD14, the rotors of these synchros being interconnected by gears 564 so as to be driven in the same ratio as the synchro transmitters. The differential synchro XD2 is provided with a handwheel 565 for manipulation by the machine operator to permit the vertical position of the spindle carrier 62 to be adjusted with respect to that of the tracer for setup purposes. The differential synchros are located in a pendant control station 566 (FIG. 1) mounted on the cross slide, the hand wheel 565 being accessible from the front of the station. The stators of the differential synchros are connected to the stators of a pair of control transformers CT2 and CT14 whose rotors are connected by gears 567 having the same gear reduction ratio as the gears 562 and 564. One lead 568 of the rotor of transformer CT2 is connected to ground through conductor 568 while the other lead is connected through a conductor 569 to a voltage divider comprised of resistor 570, potentiometer 571 and resistor 572. The rotor of the control transformer CT14 has one of its leads connected to a conductor 575 which is attached to the slider of potentiometer 571 while the other lead of the rotor is connected through a conductor 576 to one end of a potentiometer 578. The opposite end of the potentiometer is connected to ground through a conductor 579 while the control signal from the synchros is fed by the slider of the potentiometer into a bridged T network comprised of resistors 580 and 581, and condensers 582 and 583. This network corresponds to the bridged T network for the tracer shown in FIG. 21, and the components thereof may correspond in value to the components of the previously described network. The purpose of the network shown in FIG. 23 is the same as that shown in FIG. 21, namely, to stabilize the system and thereby permit an increase in the sensitivity thereof. The output from the stabilizing network is connected to the grid of an amplifying tube 585 through a resistor 586. The cathode of the tube is connected to ground through a resistor 587 and a condenser 588. The plate of the tube is connected to a positive voltage source 589 through the primary winding of a transformer 590, the secondary winding of which provides an input for the phase sensitive amplifier 421.

Further stabilization of the system is provided by a D.C. tachometer TACH2 which, as shown in FIG. 15, is driven by the hydraulic motor 87 through gears 593. As shown in FIG. 23, the D.C. signal from the tachometer is subtracted from the D.C. signal supplied by the phase sensitive amplifier to the power amplifier 422 which supplies the energizing current for the torque motor coils of the electro hydraulic valve 340, which, as shown in FIG. 15, controls the hydraulic motor 92 which operates the lead screw 93 for the spindle carrier. As shown, the motor 92 also drives the fine control transformer CT2 and, through the reduction gearing 567, the control transformer CT14. Hence, the signal produced by the control transformers will be reduced as the spindle carrier approaches correspondence with the tracer slide 85 so as to deactivate the motor 92.

The voltage divider comprised of resistor 570, potentiometer 571, and resistor 572 (FIG. 23), comprises a synchronizing network for the double-speed synchro transmission. Inasmuch as the resistor 570 is of considerably higher value than the resistor 572, the signal introduced by the fine control transformer CT2 will be considerably attenuated in the lead 575 which connects with one terminal of the rotor winding of coarse control transformer CT14. Hence, the attentuated signal from transformer CT2 will be superimposed on the full strength signal delivered by the coarse control transformer CT14 to the conductor 576. Therefore, the combined signal from the transformers supplied through conductor 576 to potentiometer 578 will be as shown by the curve 595 shown in FIG. 22. In this figure, the signal from the coarse transformer CT14 is represented by the dotted curve 596. In effect, this signal is modulated by the signal from the fine transformer CT2 to provide a resultant signal shown by the curve 595.

Assuming that the gear ratio between the fine and coarse synchros shown in FIG. 23 is 50:1, and that the value of the resistor 570 is 50,000 ohms, the value of the potentiometer 571 is 5,000 ohms, and the value of the resistor 572 is 1500 ohms, then the signal from the fine transformer CT2 will go through 25 cycles for every half cycle of the coarse transformer CT14 and the signal of the fine transformer will be attenuated approximately as shown in FIG. 22 by the voltage divider network. The signal 595 will drive the spindle carrier toward correspondence and, by connecting the transformers so that both signals approach zero from the positive direction at correspondence and both become negative the instant the rotors pass correspondence, the system will center on the zero and bring the spindle carrier into exact correspondence with the tracer slide 85. Due to the attenuation of the fine transformer signal, the curve 595 will not cross the zero axis until correspondence is reached, thereby preventing any possibility of a false null being introduced.

*In Step Indicator*

A further synchro system is utilized in the present machine to indicate whether or not the gantry cams are in step with the tracer and to stop the automatic cycling if for any reason these two devices should not be indexed to the same or corresponding positions. This indicator is shown in FIG. 25 of the drawings wherein the synchro transmitter XT5 is shown connected to the synchro receiver or control transformer CT5. As shown in FIG. 15, the synchro transmitter is driven from the lead screw 95 which feeds the tracer saddle 80 transversely of the cross slide so that the angular position of the rotor of the synchro transmitter is at all times indicative of the position of the tracer over the templates. The drive from the lead screw 95 includes a worm 600 fast on the lead screw which drives a worm wheel 601 secured to the shaft of the synchro-transmitter TX1 for the dial indicator (FIG. 19). Mounted on the same shaft is a spur gear 602 which meshes with another spur gear 603 fast on the shaft of the synchro-transmitter XT5, thereby driving this transmitter in accordance with rotation of the lead screw 95.

The synchro-receiver CT5 is, as shown in FIG. 12, driven by the shaft 138 on which the gantry cams are mounted so that this synchro will always be positioned in correspondence with the angular positions of the cams. As shown in FIG. 25, the rotor of the transmitter XT5 is excited with current from an A.C. source 604. The stator windings of the transmitter are connected to the corresponding stator windings of the receiver CT5 and the signal output from the rotor winding of the receiver is rectified by a voltage doubler circuit including rectifiers 605 and 606 and condensers 607 and 608. The rectified output is applied to the coil of a relay 220CR which relay has a pair of normally closed contacts in line E127 (FIG. 24C) of the wiring diagram. When the synchro receiver CT5 is in step with the synchro-transmitter XT5 the signal output from the receiver will be zero so that the relay 220CR will be deenergized and the contacts in line E127 will remain closed to permit lowering of the tracer onto the template during the automatic cycle of the machine. However, if for any reason the gantry cams and tracer should get out of step, a voltage will appear across the rotor winding of the receiver CT5 which will be rectified by the voltage doubler circuit and thereby energize the relay 220CR. This will cause the contacts in line E127 to open and prevent lowering of the tracer onto the template and stop the operation of the machine at this point.

AUTOMATIC CYCLE OF OPERATION

The present machine is provided with electrical controls for causing the mechanism heretofore described to function automatically in a predetermined sequence so that once started it will completely machine the workpiece in a single, continuous operation. Before describing the control circuits by means of which this result is achieved, a general description of the machine cycle will be given to provide a better understanding of the sequence of operation of the various parts of the machine and of the manner in which the electrical controls must function in order to cause the parts to operate in the desired fashion.

Assuming that the power circuits have been energized to prepare the electric and hydraulic equipment for operation, and that the airplane wing or other workpiece has been secured in position on the bed of the machine with the beam in its home position as shown in FIGURE 3, the machine operation is started by depressing a push button which raises the gantry index fingers and simultaneously disconnects the gantry synchros. The gantry cams are indexed counterclockwise from their "0" positions to their #1 positions, after which the fingers are lowered to sense the notches in the cams and thereby determine the positions to which the left hand and right hand gantries are to be moved. The synchros are now connected and cause the gantry servomechanisms to position the gantries in accordance with the information recorded on the cams. Simultaneously with the indexing of the gantry cams, the tracer is indexed rearwardly from its "0" or start position to a position directly over the #1 template. As soon as both indexes are complete and the gantries are positioned, the tracer is connected and moved down onto the template, thereby moving the cutter down onto the workpiece. As the tracer moves down, the cross slide clutch is shifted to its feed rate position. When the tracer roller contacts the template, a tracing feed rate voltage is supplied to the cross slide servomechanism, and the cross slide moves to the left with the tracer following the template to control the depth of the cut made by the cutter in the workpiece. At the end of the cut, the tracer encounters a rise on the template which lifts the cutter above the work line. The tracer is then moved up off of the template, and the cross slide clutch is shifted to its rapid traverse position.

The gantry index fingers are also raised from the cams, after which the cams are indexed to their #2 positions with the gantry syncros disconnected. The fingers are then lowered onto the cams and the synchros reconnected to cause the gantries to be positioned for the next cut. At the same time that the gantry cams are indexed, the tracer is indexed one step rearwardly to bring it over the #2 template. As soon as this is done, the rapid return stop roller on the tracer is lowered into active position, and a rapid traverse return signal voltage is applied to the cross slide servomechanism to cause the cross slide to move to the right in rapid traverse. The templates are each provided at their right hand ends with an upstanding abutment which contacts the rapid return stop roller and causes it to be raised to its inactive position, thereby terminating the rapid traverse of the cross slide. The tracer is then lowered onto template #2, and the cross slide clutch is shifted to its feed rate position. As soon as the tracer roller contacts the template, a feed rate signal voltage is applied to the cross slide servomechanism, and the next cut is effected. This sequence of operations is continued until the last cut is completed, whereupon the index cams and tracer are indexed to a last, or $n+1$, position. When the index fingers are lowered into contact with the cam surfaces, which correspond to the surfaces in the "0" positions of the cams, the synchros are connected and return the gantries to their starting positions. The cross slide is moved in rapid traverse to the right as previously with the stop roller lowered. However, since there is no abutment present on the $n+1$ template to contact the stop roller, the cross slide continues to the right until it reaches its starting position. As soon as this occurs, the stop roller is raised and movement of the cross slide is stopped. At the same time, the tracer is raised to its uppermost position, and the tracer is indexed from rear to front to its starting position where it lies over the "0" template. After the gantries and the cross slide have both reached their starting position, the gantry index fingers are raised and the cams are indexed clockwise back to their "0" positions. The fingers are now moved down onto the cams and the automatic cycle is terminated with the machine restored to its original starting position. The completed workpiece may now be removed from the machine and another workpiece substituted in its place ready for the next machining cycle.

WIRING DIAGRAM

The relays, limit switches and solenoids which are utilized to automatically control the functioning of the various parts of the machine during each machining cycle are shown in the cross-the-line wiring diagrams, FIGURES 24A to 24G, inclusive. In these wiring diagrams, the energizing potential is furnished by the electrical conductors 615 and 616, which are continued from one sheet of drawings to the next. The relays and solenoids, together with the various relay contacts and limit switches connected in circuit therewith, are connected across these conductors. The relay coils are represented by the circles at the right hand sides of the wiring diagrams and are designated as CR for control relays; LR for limit switch relays and SR for solenoid relays.

To facilitate reference to the different components and their contacts on the wiring diagram, an index column has been provided immediately to the right of the conductor 616, in which numerals prefixed by the letter E serve to indicate the vertical location of the components and contacts. To the right of the index column is a further column in which the locations of the various contacts of the relays are given, together with a legend descriptive of the function of the particular relay or solenoid.

In this column, the underscored index numbers designate normally closed contacts while the index numbers not underscored designate normally open contacts.

Normally, the legends indicate the functions which are performed when the relays or solenoids are energized. In those cases where the limit switches are involved, however, the legend indicates the function performed with the limit switch in the position shown on the diagram with the exception of limit switch 4LS (E256) in which case the limit switch is shown in its closed position which is the position it assumes until the last index of the gantry cams is effected whereupon it is opened by the cam 222 (FIG. 12).

In connection with the limit switch contacts shown on the wiring diagram, the triangular element shown on the contact blade may be considered as representing a weight tending to bias the blade downwardly so as to normally open or normally close the switch when it is released by the part which actuates it.

Automatic Cycle

The automatic cycle of the machine is started by depressing the start push button 617 (E40) located on the control panel of an electrical cabinet or console 618 (FIG. 4). Depression of this switch energizes the automatic cycle relays 2CR, 2CRA, 2CRB, and 2CRC (E40–E43) provided all of the required bed and cross slide conditions before starting the cycle are satisfied. If these conditions are satisfied, relays 207CR (E300) and 122CR (E298) will be energized, thereby closing the normally open contacts of these relays shown in line E40 of the wiring diagram. Once energized, the automatic cycle relays 2CR et seq. will remain energized throughout the entire machine cycle, or until the emergency stop push button 619 (E40) is depressed, even though the push button 617 be released. This is due to the fact that the normally open contacts of relay 2CR in line E41 are closed upon energization of the automatic cycle relay 2CR and the normally open contacts of relay 120CR in line E41 are held closed by energization of relay 120CR (E192) at the start of the automatic cycle by the closed contacts of relay 20CRA in line E192 and during the machine cycle by the closed contacts of relay 5LR in line E193. Upon restoration of the index cams to their "0" positions at the end of the cycle, contacts 5LR in line E193 will open and deenergize relay 120CR. This will drop out relays 2CR et seq. and conclude the machine cycle.

Raising Index Fingers

Energization of relay 2CR causes the normally closed contacts of this relay found in line E59A to be opened, thereby deenergizing relay 215CR (E59A). Accordingly, the contacts of this relay in line E56 will open and allow the normally open contacts of relay 5CRA in line E55 to control the energization of relay 2SR. At the same time, the contacts of relay 2CR in line E51 will close and energize the relay 1SR (E51) and solenoid 1SOL (E233) to raise the index fingers provided relays 26LR (E273), 17LR (E266), and 20LR (E268) are energized to close the normally open contacts of these relays found in line E50. The relay 26LR will be energized since the cross slide is in its starting position to hold limit switch 26LS (E273) closed. The relays 17LR and 20LR will be energized since the left and right hand gantries are in their starting positions so as to hold limit switches 17LS (E266) and 20LS (E268) closed. Energization of 1SR will energize solenoid 1SOL (E233 and FIG. 12) to operate the hydraulic cylinder 198 (FIG. 12) and raise the gantry index fingers. Once energized, the relay 1SR (E51) will be held energized by closure of its contact 1SR (E52). As soon as the fingers have reached their raised positions, the contacts 2LR (E51) will be opened through the action of the cam 210 (FIG. 13) which oscillates through ½ revolution each time the fingers are raised or lowered to throw the toggle type limit switch 2LS (E252) to its opposite position at the end of the stroke. When the fingers are fully raised, the switch will be operated to energize relay 2LR and open contacts 2LR in line E51. The solenoid relay 1SR will remain energized, however, through the contacts of relay 2SR found in line E52 until relay 2SR (E55) is energized to lower the fingers.

As the fingers move away from the cams, the gantry positioning synchros will be disconnected since relay 6LR (E259) will be deenergized and the 6LR contacts in line E46 will be opened, thereby deenergizing relay 201CR (E47). Accordingly, the normally open contacts of this relay in FIGURE 20 will prevent the signal from the synchros from reaching the phase sensitive amplifier, the input of which will be grounded through the normally closed contacts of the same relay as illustrated in this figure.

*Indexing of Cams Counterclockwise*

Energization of relay 2LR (E252) upon raising of the index fingers will cause the normally open contacts of this relay in the line E78 to close and thereby energize relay 4SR (E78) and solenoid 4SOL (E236 and FIG. 12) to initiate operation of hydraulic motor 146 (FIG. 12) in a direction to rotate the cams counterclockwise. As the cams move out of "0" position, limit switch 1LS (E250 and FIG. 12) is released by a cam 620 on shaft 147, thereby deenergizing relay 1LR. This causes the contacts 1LR in line E87 to close, thereby energizing pickup coil 4CRB (E87) of a latched-in relay 4CR. This relay is picked up when coil 4CRB is energized and is held in this condition by a mechanical latch until it is released upon energization of dropout coil 4CRA (E86). Energization of pickup coil 4CRB will open contact 4CR in line E78, but relay 4SR will remain energized since contacts 1LR in line E79 are now closed. At the end of one revolution of cam 620 (FIGURE 12), the contacts of limit switch 1LS (E250) will be closed to energize 1LR and deenergize relay 4SR, thereby terminating the indexing movement of the cams after approximately three degrees of movement thereof in a counterclockwise direction.

*Lowering Fingers*

When the fingers are in their raised positions, relay 3LR (E254) will be deenergized and contacts 3LR (E55) will be closed. Closure of contacts 1LRA (E55) upon completion of the indexing movement of the cams will cause solenoid relay 2SR (E55) to be energized since relay 5CRA (E87A) is now energized through the closed contacts of relay 4CR, thereby closing contacts 5CRA in line E55. Energization of relay 2SR (E55) will energize solenoid 2SOL (E234 and FIGURE 12) and deenergize relay 1SR (E51) and solenoid 1SOL. The fingers will thereby be lowered onto the cams. When the fingers are down, contacts 3LR (355) will open and deenergize solenoid 2SOL. However, contacts 5LR (E50) are now open as are also the contacts 4LR (E51) so that closure of contacts 2LR and 2SR in lines E51 and E52 will not energize 1SOL to raise the fingers, the relay 14CRA (E163) being deenergized at this time.

*Positioning of Gantries*

As soon as all of the index fingers have seated against the bottoms of the notches in the #1 position of the gantry index cams, the relay 6LR (E259) will be energized and close the contacts of this relay found in line E46. Since the contacts of relays 2CR (E40) and 5CR (E88) are also closed at this time, relay 201CR (E47) will be energized so as to connect the signal from the gantry synchros to the gantry positioning servomechanisms (FIGURE 20) and thereby cause the gantries to move from their left hand wing zero line positions to the positions indicated by the notches in the cams. The gantries will be moved in rapid traverse by the solenoid operated valves 290 and 407 (FIGURES 14 and 16A) until they are within approximately 2″ of their final positions whereupon the electro-hydraulic valves 250 and 405 will take over and effect the final positioning of the gantries. Referring to FIGURE 20, which illustrates the switching panel for the left hand gantry, the relays 1SWRA and 2SWRA will be energized by the large signals from the coarse and medium synchros, respectively. It will be understood that the corresponding switching panel for the right hand gantry synchros contains corresponding relays 1SWRB and 2SWRB. Accordingly, relays 213CR, 214CR, 217CR and 218CR (E304–E307) will be deenergized. Therefore, contacts 218CR and 217CR found in lines E245A and E247A will be closed. Also, relays 213SR or 214SR (FIGURE 20) for the left hand gantry, and the corresponding relays 215SR or 216SR (not shown) for the right hand gantry, will be energized by the large signals to the gantry torque motors in valves 250 and 405. Hence, either 13SOL or 14SOL (E245–E246) for the left hand gantry, and 15SOL or 16SOL (E247–E248) for the right hand gantry will be energized to actuate its associated high rate valve and cause the gantries to be moved in rapid traverse in the appropriate direction. When relay 214CR (E305) is deenergized due to the presence of a large signal from the medium synchro of either gantry, thereby preventing energization of relay 115CR (E130) and consequent lowering of the tracer onto the template until the gantries are near their final positions. After the signals from the coarse and medium synchros have been reduced to a point where relays 2SWRA and 2SWRB, and 1SWRA and 1SWRB become deenergized, the signals from the fine synchros will be delivered by the switching circuit (FIGURE 20) to the phase sensitive amplifiers and cause the electro-hydraulic valves to bring the gantries into their final positions.

*Indexing of Tracer*

Simultaneously with the indexing of the gantries, the tracer is indexed rearward from its "0" position at the front of the machine to the #1 template. This is effected as follows:

When relay 2CRB is energized upon depression of push button 617 (E40) the contacts of this relay in line E101 are closed, thereby energizing relay 10SR through the normally closed contacts of relays 6CR and 20CR, limit switch 24LS (FIGURE 15), which is closed until the tracer reaches the n+1 template, and the contacts of relay 35LR (E291) which is energized when the tracer is in its raised position. Energization or relay 10SR causes solenoid 10SOL (E242 and FIGURE 15) to be energized, thereby operating the tracer index motor 94 which rotates the lead screw 95 and feeds the tracer saddle 80 rearward on the cross rail 53. As timing cam 359 rotates out of home position, limit switch 22LS opens, thereby deenergizing relay 22LR (E269) and permitting the normally closed contacts of this relay in lines E102 and E109 to close. Pickup coil 6CRB (E109) of the latched-in relay 6CR is thereby energized and opens the normally closed contacts of this relay in line E101 and closes the normally open contacts thereof in line E110. After one revolution of the lead screw, which moves the tracer over the #1 template, the limit switch 22LS is closed by the timing cam 359, the relay 22LR is energized, and the circuit of relay 10SR is broken, thereby deenergizing solenoid 10SOL and stopping index motor 94 so as to terminate the indexing operation.

*Depth Tracing Initiated*

Energization of relay 22LR closes the normally open contacts of this relay in line E110 to energize relay 7CR. This closes the normally open contacts of this relay in lines E126 and E127, and the latter contacts cause relay 115CR (E130) to be energized through the contacts in line E127 of relays 5CR, 214CR, 220CR (FIG. 25), 2CRB, 26LR, 20CR, 7CR, and 14CR as soon as indexing of the tracer and gantries is completed. Energization of relay 115CR closes the contacts thereof in line E128 around the contacts of relay 26LR so as to provide a holding circuit for relay 115CR after the cross slide moves away from limit switch 26LS (E273 and FIGURE 15). It also causes the normally open contacts of relay 115CR in line E117 to close, thereby energizing relays 106CRA and 106CRC (FIG. 21) to connect the tracer to its servomechanism. The tracer thereby moves down until it contacts the #1 template. Downward movement of the tracer opens the limit switch 35LS (E291 and FIGURE 15), thereby deenergizing relay 35LR. This causes the contacts of this relay in line E135 to open and closes the contacts of this relay in line E137 to energize relay 12SR (E137). This energizes solenoid 12SOL (E244 and FIGURE 15) and shifts the cross slide clutch 322 from rapid traverse to feed rate position.

The normally open contacts of relay 106CRA in line E123 are also closed at this time so as to energize relay 107CR as soon as the limit switch 36LS (E123 and FIG. 15) is released upon contact of the tracer roller with the #1 template. Energization of relay 107CR connects the tracing feed rate voltage to the cross slide servomechanism by means of the 107CR contacts shown in FIG. 21. The cross slide thereby moves to the left across the beam with the cutter under the control of the tracer to effect a cut of the depth indicated by the #1 template in the workpiece.

Release of limit switch 36LS also causes the contacts of relay 36LR in line E160 to close, thereby energizing relay 116CR.

*Depth Tracing Terminated*

Each of the templates 78 (FIGS. 4 and 5) is provided at its left hand end with a rise 621 which is of sufficient height to bring the cutter above the work line. Accordingly, when the cutter reaches the left hand end of the cut, the tracer will encouner the rise and elevate the cutter to a point where limit switch 34LS (E287 and FIG. 15) is released, thereby energizing relay 34LR. This will cause the normally open contacts of the relay in line E161 to close and, since the contacts of 28LR and 30LR are closed when the cutter and tracer are down and, since the relay 116CR (E160) is energized during the tracing, thereby closing the "lock-in" contacts of this relay in line E161, the relay 108CR (E162) will be energized and close the contacts of this relay in FIG. 21. This will unbalance the phase sensitive amplifier and cause the tracer to move up until the limit switch 35LS (E291 in FIG. 15) is released, thereby energizing relay 35LR. This will break the circuit through relay 116CR (E160) and open the contacts of this relay in line E161. This will release relay 108CR and stop upward movement of the tracer. As soon as the tracer roller disengages from the template, limit switch 36LS (E123) is opened, thereby deenergizing relay 107CR and stopping the feed rate to the cross slide (FIG. 21).

At the same time that relay 108CR was energized by the tracer moving up on the rise 621, relay 14CR (E161) was also energized to open the normally open contacts of this relay in line E127 and thereby deenergize relay 115CR (E130) and relays 106CRA and 106CRC (E117 and E120). This disconnects the tracer as shown in FIG. 21. Energization of relay 14CR also energizes relay 17CR (E164). This relay locks itself in across the contacts of relay 14CR by means of contacts 17CR and 15CR (E163). Hence, when the relay 35LRB is energized by movement of the tracer into its raised position above the templates, relay 15CR (E166) will be energized at the same time that relay 14CR is deenergized. Energization of relay 15CR will deenergize relay 17CR and energize relay 18CR (E167) which will lock itself in through its contacts in line E167. Energization of relay 15CR will cause the normally open contacts of this relay in line E107 to be closed, thereby energizing the latch coil 6CRA to permit the armature of relay 6CR to drop out, thereby restoring this relay to its initial condition. Since relay 35LR is now energized, the solenoid relay 10SR (E101) will be energized to index the tracer into position over the #2 template. Energization of relay 10SR will close the contacts of this relay in line E167 and thereby hold in relay 15CR until indexing of the tracer is completed. Also, the brief energization of relay 14CR (E161) in the manner previously described, causes the normally open contacts of this relay in line E86 to close, thereby energizing the coil 4CRA of relay 4CR so as to drop out the armature of this relay and restore it to its initial condition. Energization of relay 14CRA (E163) also closes the circuit through relay 1SR (E51) and raises the index fingers. When these fingers are fully raised, relay 2LR is energized, thereby energizing relay 4SR (E78) to index the gantry cams one step counterclockwise to the #2 position. After indexing of the cams is completed, contacts 1LRA in line E55 close, thereby energizing relay 2SR and solenoid 2SOL to lower the fingers onto the cams. At the same time, the gantry synchros are connected to position the gantries as indicated by the cams.

*Rapid Traverse Return*

As previously mentioned, release of limit switch 34LS (E287) by upward movement of the tracer caused by the rise on the template energizes relay 34LR and closes the contacts of this relay in line E135 and opens the contacts of this relay in line E136. As soon as the tracer is raised further to release limit switch 35LS and energize relay 35LR, the contacts of this relay in line E135 will be closed and the contacts of this relay in line E137 will be opened, thereby energizing relay 11SR (E135) and solenoid 11SOL (E243) to shift the cross slide clutch to rapid traverse position.

After indexing of the tracer to the #2 template has been completed, relay 7CR (E110) will be energized by closing of contacts 22LR (E110) at the end of the indexing movement. Energization of relay 7CR will close the contacts of this relay in line E171 and energize relay 6SR since relays 18CR (E167) and 33LR (E286) are both energized at this time. This will energize solenoid 6SOL (E238) and operate hydraulic motor 369 (FIG. 15) to lower the rapid traverse return stop roller 366. Energization of relay 6SR will close the contacts of this relay in line E172 and lock in the relay around the contacts of relays 18CR and 15CR in line E171. When the roller is fully lowered, limit switch 32LS will be closed to energize relay 32LR and open the contacts of this relay in line E238, thereby deenergizing solenoid 6SOL (E238). Contacts 32LR in line E172 will be closed, thereby energizing relays 16CR and 113CR. Energization of relay 16CR will open the contacts of this relay in line E167, thereby deenergizing relay 18CR and opening the contacts of this relay in line E171. Energization of relay 16CR will also close the contacts of this relay in line E180 to energize relay 117CR which locks itself in across the contacts of relay 16CR by contacts 117CR in line E181.

Energization of relay 113CR will close its contacts in FIG. 21 and connect the power feed rate voltage to the cross slide servomechanism. The cross slide will now move in rapid traverse to the right until the stop roller 366 is contacted by an upstanding abutment 622 (FIG. 4) provided on the right hand end of each of the templates 78 except the last or n+1 template. This abutment lifts the stop roller and opens limit switch 33LS, which deenergizes relay 33LR and deenergizes relay 6SR (E171) to open the contacts of this relay in line E172. This deenergizes relays 16CR and 113CR since the contacts of relay 18CR in line E171 are now open. Deenergization of relay 113CR disconnects the power feed rate voltage from the cross slide servomechanism (FIG. 21) and stops rapid traverse right of the cross slide. Deenergization of relay 33LR closes the contacts of this relay in line E175 and energizes relay 5SR (E174) which locks itself in around the 33LR contacts by the contacts 5SR in line E176. This causes solenoid 5SOL (E237) to be energized and actuates motor 369 (FIG. 15) to raise the stop roller until limit switch 31LS (E280) is closed to energize relay 31LR and open the contacts of this relay in line E174.

Repeat Tracing

Energization of relay 31LR also closes the contacts of this relay in line E181. At this time, relay 117CR (E180) is energized since it is locked in by its own contacts across the contacts of relay 16CR in line E180. Hence, relay 118CR is energized, thereby closing its contacts in line E129. This will energize relay 115CR provided indexing of the gantry cams and tracer is completed (5 CR, 7CR, and 220CR FIG. 25) and the gantries positioned (214CR), to thereby energize relays 106CRA and 106CRC (E117 and E120), and connect the tracer and cause it to move down onto template #2.

As the tracer moves down, it first opens limit switch 35LS (E291) which deenergizes relay 35LR. This opens the normally open contacts of this relay in line E135 and closes the normally closed contacts of this relay in line E137. Relay 12SR (E137) is thereby energized to shift the cross slide clutch to feed position. When the tracer roller contacts the template, the limit switch 36LS (E123) will be closed to energize relay 107CR and supply tracing feed rate voltage to the cross slide servomechanism. Energization of relay 36LR will also cause the normally closed contacts of this relay in line E180 to open, thereby deenergizing relays 117CR and 118CR. The machine will now go into automatic tracing to the left and will be stopped at the end of the cut by the rise on the left hand end of the template which lifts the cutter above the work line and releases limit switch 34LS and energizes relay 34LR. The gantry index fingers are then raised and the gantry cams indexed to the next position after which the fingers are lowered and the gantries repositioned in accordance with the information recorded on the cams. At the same time, the tracer is raised above the templates to release limit switch 35LS and energize relay 35LR. The tracer is then indexed to the next template, the cross slide clutch is shifted to its rapid traverse position, and the rapid traverse stop roller is lowered to initiate rapid traverse of the cross slide to the right. Thus, the machine continues to automatically trace left and rapid return right with indexing of the cams and the tracer after each cut until the entire workpiece has been machined.

Conclusion of Automatic Cycle

After the machine has traced the last template and has encountered the rise 621 on the template which moves the tracer up until limit switch 34LS has been released, thereby causing the index fingers to be raised and the gantry cams to be indexed to the last, or $n+1$, position where limit switch 4LS is opened to deenergize relay 4LR (E256), the tracer is raised above the template to release limit switch 35LS and cause indexing of the tracer over the last, or $n+1$, template, the cross slide clutch is shifted to its rapid traverse position, and the stop roller is lowered to initiate rapid return of the cross slide to the right.

Deenergization of relay 4LR causes the normally closed contacts thereof in line E59B to close and energize relay 215CR (E59A). The contacts of this relay in line E56 are therefore closed, and since relay 1LRA is energized after the cams have been indexed to their $n+1$ position, relay 2SR (E55) will be energized to energize solenoid 2SOL (E234) to lower the index fingers onto the cams. The cam surfaces corresponding to the $n+1$ positions of the cam are the same as the cam surfaces corresponding to the "0" positions and call for the gantries to return to the starting line 74A (FIG. 3) and thereby close limit switches 17LS and 20LS. The $n+1$ template, however, does not have any abutment at its right hand end for contacting the stop roller so that the cross slide continues to move until it contacts limit switch 26LS.

When the stop roller was lowered, relay 16CR (E172) was energized and held energized during the rapid return of the cross slide. At this time relay 120 (E192) is energized through the closed contacts of relay 5LR (E193), the relay 5LR being energized all the while the gantry cams are out of their zero index positions. Hence, the relay 119CR (E182) is energized and is locked in by its contacts in line E183 across the contacts of relay 16CR in line E182. Accordingly, when the cross slide contacts limit switch 26LS and energizes relay 26LR (E273), the relays 20CR (E184), 20CRA (E185) and 20CRB (E186) are energized. Accordingly, relay 5SR (E174) will be energized to energize solenoid 5SOL (E237) and raise the stop roller. Energization of relay 20CRA (E185) causes the contacts of this relay in line E180 to open, thereby deenergizing relay 117CR so that relay 118CR (E181) will not be energized when the stop roller is raised. Hence, the contacts 118CR in line E129 will remain open and relay 115CR (E130) will not be energized to lower the tracer. Also, the contacts of relay 20CRA in line E162 will be closed, thereby maintaining relay 108CR energized and signaling the tracer to rise until the limit switches 28LS and 30LS (E276 and E279) are operated to deenergize relays 28LR and 30LR. Energization of relays 20CR and 20CRB closes the contacts of these relays in lines E108 and E85, thereby dropping out the armatures of the latch-in relays 6CR and 4CR. The relays are thus prepared for the next indexing operation of the gantry cams and the tracer.

When the stop roller reaches its raised position, limit switch 31LS is closed, thereby energizing relay 31LR and closing the contacts of this relay in line E112. Since the contacts of relays 20CR and 35LR are now closed, and since the relay 23LR is deenergized, thereby maintaining the contacts in line E113 closed, the solenoid relay 9SR (E112) will be energized and energize solenoid 9SOL (E241) to cause the tracer to be continuously indexed from rear to front until it reaches its starting position and energizes relay 23LR, thereby opening the contacts of this relay in line E113. Since the contacts of relay 20CR in line E109 are open, the pickup coil 6CRB will not be energized on each revolution of the cam 359. Energization of relay 10SR (E101) is prevented by the open contacts of relay 20CR in line E101.

After the gantries reach their home positions, relays 17LR and 20LR (E266 and E268) will be energized, thereby closing their contacts in line E50. As soon as relay 26LR is energized by the cross slide contacting limit switch 26LS, and since relay 4LR is now deenergized, a circuit is completed through relay 1SR (E51), and solenoid 1SOL (E233) is energized to raise the index fingers. After the fingers have reached their raised positions, relay 2LR (E252) is energized, thereby closing its contacts in line E90. At this moment relay 4LR (E256) is deenergized so that its contacts in line E90 are closed. Relay 5LR (E257) is energized, thereby closing its contacts in line E91. Relays 20CRB, 17LR, and 20LR are energized so that the contacts of these relays in line E90 are closed and relay 3SR is energized and its contacts in line E91 are closed around the contacts of relay 4LR. Solenoid 3SOL (E235) is thereby energized to index the gantry cams clockwise from their $n+1$ positions back to their zero positions, the contacts of relay 20CRB in line E87 being open to prevent energization of the pickup coil 4CRB upon repeated closure of limit switch 1LS during the return indexing of the cams. Energization of relay 4SR (E78) is prevented by the open contacts or relay 20CRB in line E78. As soon as the cams move out of their $n+1$ positions, relay 4LR is energized, thereby deenergizing relay 215CR (E59A). When the cams reach their zero positions, the limit switch 5LS is opened, thereby deenergizing relay 5LR and causing the contacts of this relay in line E91 to open so that the relay 3SR will be deenergized when the cam 620 is on limit switch 1LS. At the same time, the contacts of relay 5LR in line E193 will open and, since relays 20CRA (E185) and 23LR (E270) are energized and relays 28LR and 30LR (E276 and E279) are deenergized, relay 120CR (E192) will be deenergized. When relay 120CR is deenergized, the contacts of this relay in line E41 will open, thereby dropping out relays 2CR et seq. so as to terminate the automatic cycle. When relay 120CR is deenergized, it will cause relay 119CR (E182) to be deenergized, thereby deenergizing relays 20CR et seq. (E184–E186) so as to cause relay 120CR to be reenergized at the end of the cycle. Deenergization of relay 2CRA will cause the contacts of this relay in line E59A to close and thereby energize relay 215CR. The contacts of this relay in line E56 will thereupon be closed so as to energize relay 2SR and lower the index fingers onto the cams at the end of the cycle.

*Machining Right Hand Wing*

Prior to the commencement of the automatic cycle, the gantries are positioned at the rear of the machine on the line 74A (FIG. 3) to permit loading and unloading of the work from the front of the machine. When it is desired to machine a R.H. wing instead of a L.H. wing, switch 623 (E198) is turned to the Right Hand Wing position, thereby energizing relays 203CRA, 203CRB, 203CRD, and 203CRF (E199, E200, E202, and E204). These relays have contacts which are interposed in the S1 and S3 stator leads of the medium and fine gantry synchros (see FIG. 20 for L.H. gantry synchros) and operate to reverse the sense of the synchro receivers CT6—CT7 and CT9—CT10 (FIG. 16B). Since relay 215CR (E59A) is energized prior to the start of the automatic cycle, relay 216CR (E205) will be energized through the contacts 215CR in line E204A. As a result, the normally closed contacts of relay 216CR in lines E198 and E201 will be held open and cause relays 203CR and 203CRC to be deenergized, thereby maintaining the gantries at the rear of the machine. However, as soon as the automatic cycle start button 617 (E40) is depressed, the relay 2CRA will be energized, thereby opening its contacts in line E59A to deenergize relays 215CR and 216CR. Relays 203CR and 203CRC will thereby be energized and cause the S1 and S3 stator leads of the coarse synchros (FIG. 20) to be reversed. Hence, all of the S1 and S3 synchro stator leads will be reversed at the beginning of the automatic cycle. At the same time that the coarse synchros are reversed, the index fingers will be raised through the closure of contacts 2CR in line E51. As the fingers leave the cams, the contacts 6LR in line E46 will open and deenergize relay 201CR (E4) so as to disconnect the synchros from the gantry servomechanism. The synchros will remain thus disconnected until the cams are indexed to the #1 positions when the fingers will again be lowered onto the cams to sense the information impressed thereon by the depth of the notches 125–127 (FIG. 7). Relay 201CR will then be energized to reconnect the synchros and cause the gantries to move to their right hand wing positions.

The machine cycle will then proceed in the same manner as before until the gantry cams are indexed to their $n+1$ positions at the conclusion of the last cut when the limit switch 4LS (E256) will be actuated by the cam 222 (FIG. 12) on the cam 119 (FIG. 11) to deenergize relay 4LR. The relay 215CR (E59A) will thereby be energized through the contacts of relay 4LR in line E59B to deenergize relays 203CR (E198) and 203CRC (E201). Hence, when the fingers are lowered to sense the surfaces of the cams which, in the $n+1$ positions correspond to the surfaces in the "0" positions (FIG. 1), the coarse synchros will no longer be reversed and will return the gantries to their starting positions at the rear of the machine. The cross slide will now move in rapid traverse to the right until it strikes limit switch 26LS. The stop roller will thereupon be raised and cause the carrier and tracer to move up to limit switches 28LS and 30LS. At the same time the tracer will be indexed from rear to front until limit switch 23LS is closed, and the fingers will be raised by solenoid 1SOL. Upon closure of the contacts of relay 2LR in line E90, relay 3SR will be energized and index the gantry cams clockwise back to their "0" positions, thereby causing limit switch 4LS to close and energize relay 4LR. Relay 215CR (E59A) will thereupon be deenergized to again reverse the coarse synchros but since the fingers are up, the synchros will be disconnected by relay 201CR (E47) so that the gantries will not leave their starting positions. When the cams reach their zero positions, limit switch 5LS will be opened, thereby deenergizing relay 5LR and permitting the contacts of the relay in line E59A to close so as to cause relay 215CR to be energized at the end of the cycle and close the contacts 215CR in line E56 to lower the index fingers onto the cams. The relay 201CR (E47) is, of course, deenergized at this time by the open contacts 2CR in line E46 so that the synchros will be disconnected and the gantries will remain in their starting positions.

EXAMPLE OF WORK

To prepare the machine for a milling operation on a particular wing section, the templates 78 are each provided with a profile which corresponds to the depth contour of one of the cuts to be made in the wing. Since the location of each cut is determined by the positions of the gantries, the number of templates will normally be equal to the number of notches on each of the gantry cams. The notches in the latter cams are machined to whatever depth is required to provide proper positioning of the gantries for each cut to be made by the cutter as the cross slide is traversed across the beam. In the present synchro transmission system, the synchros are zeroed in the X axis (FIG. 3) which extends through the center of the bed. The coarse synchros are geared to turn one revolution for every 420 inches of travel of the gantries. The medium synchros are geared 42:1 with respect to the coarse synchros so that they turn one revolution for every 10 inches of travel of the gantries. The fine synchros are geared 50:1 with respect to the medium synchros so that they turn one revolution for every .2 inch of travel of the gantries. In order, therefore, to position the gantries at the rear of the machine on the line 74A which is 70 inches from the X axis, the coarse synchro must be turned 60 degrees away from zero. For this position of the gantries, the medium and fine synchros must be at zero. If the sensing fingers for the coarse synchros move 4.2 inches per revolution of the synchros, then the fingers must move .7 inch to turn the coarse synchros 60 degrees. Accordingly, if the coarse synchro cams are designed with a notch .7 inch deep to zero the synchro on the X axis, then a notch 0 inches deep, i.e., the outer periphery of the cam will turn the synchro 60 degrees and locate its associated gantry on the line 74A. This same peripheral surface may serve as the "0" position for the fine and medium synchro sensing fingers since each of these synchros must be on zero when the gantries are on the line 74A. If the sensing fingers for the medium and fine synchros move only two inches per revolution of their associated synchros, it is feasible to cut the notches from 0 to 2 inches deep in the medium and fine cams to control the positioning of these synchros, through the range of 0 to 360 degrees.

Suppose, for example, that a particular cut to be made in the workpiece requires that the left hand gantry be moved to a position 68.6857 inches forward of the line 74A, and that the right hand gantry be moved to a position 80.3050 inches forward of this line, then the depth of the notches in the coarse, medium and fine cams for the left hand gantry for this particular cut would be .687, 1.737 and .857 inches, respectively. Similarly, the depth of the notches in the coarse, medium and fine cams for the right hand gantry would be .803, 061, and 1.050 inches, respectively.

When a part of the opposite hand is to be machined, for example, a right hand wing instead of a left hand wing, the S1 and S3 leads of the gantry synchros are reversed to thereby reverse the sense of the signals produced by the receivers CT6–CT11. Hence, the gantries will move to positions which are the same distance from the X axis but on the opposite side thereof. This is the same as saying that the distance 68.6857 inches and 80.3050 inches are measured from the line 74B instead of from the line 74A. In this way it is possible with the present system to machine left hand and right hand parts from the same cams. When the setup is changed from a left hand wing to a right hand wing, it is, of course, necessary to change the sign of the compensation dialed into the inner dials 172 (FIG. 10) to correct for the deviation of the center of the cutter face from the datum line 74A (FIG. 3). This is due to the fact that the direction of cutter offset always remains the same while the direction of measurement from the X axis is reversed when a right hand wing is to be machined in place of a left hand wing.

Having thus described my invention, what I claim as new and useful and desire to secure by Letters Patent is as follows:

1. In a control mechanism for a machine tool having a member movable to the any one of a plurality of predetermined positions, the combination of a plurality of independently operable synchro transmitters, a plurality of synchro receivers geared together for conjoint rotation at different speeds, there being one receiver electrically connected to each transmitter, means for determining the various positions to be assumed by said movable member including a stepped element having as many steps thereon as there are positions to be assumed by said member, there being one stepped element for each synchro transmitter, and a finger for feeling off the steps of each element and for positioning said synchro transmitters in accordance with the depth of the steps sensed thereby, and a servomechanism controlled by the signals from said synchro receivers for moving said member to one of said predetermined positions as determined by the steps on said elements.

2. The control mechanism of claim 1 including means for intermittently indexing said storage means to move successive steps on said elements into position to be sensed by said fingers.

3. In a positioning control mechanism for a machine tool having a bed, a pair of parallel ways on opposite sides of the bed, a gantry supported on each of the ways for translation therealong, a swivel on each gantry, a beam extending over the bed and supported at its ends on the swivels, and a cutter supported on the beam for translation along a line passing through the pivot points of the swivels, the combination of means for moving said gantries to predetermined positions on said ways to locate said beam in various preselected positions with respect to a datum line, said means including a storage device containing data signifying the different positions to be assumed by the gantries with reference to the datum line, a synchro transmitter associated with each of the gantries, and means for sensing the data contained on said storage device and transferring it to said transmitters, a synchro receiver having its stator leads connected to the stator leads of each synchro transmitter, and means for switching the connections between the stator leads of said synchros to cause said moving means to move said gantries to a different set of predetermined positions under the control of said storage device.

4. The positioning control mechanism of claim 3 wherein said switching means includes means for reversing the sense of said synchro receivers to thereby reverse the direction of movement of the gantries from the datum line under the control of said storage device.

5. In a positioning control mechanism for a machine tool having a pair of relatively movable supports and means for moving one of said supports to different preselected positions with respect to a datum position, the combination of a storage means containing data signifying the different positions to be assumed by said one support, means for sensing the data contained on said storage means, a plurality of independently operable synchro transmitters, means for transferring the data sensed by said sensing means to said transmitters, a plurality of synchro receivers geared together for conjoint rotation at different speeds with each receiver having its stator leads connected to the stator leads of its associated synchro transmitter, and means for switching the connections between the stator leads of said synchros to cause said moving means to move said support to a different set of preselected positions under the control of said storage means.

6. The positioning control mechanism of claim 5 wherein said switching means includes means for reversing the sense of said synchro receiver to thereby reverse the direction of movement of the support from the datum position under the control of said storage means.

7. A servomechanism for positioning a machine element in accordance with a command signal comprising a multi-speed synchro transmission including a plurality of synchro transmitters and a plurality of synchro receivers, and means for positioning said machine element in accordance with the signals from said synchro receivers, said means including a synchronizing network controlled by the signals from the receivers for shifting the control from one receiver to another as the element approaches the position determined by the command signal, a hydraulic servomotor for positioning said element, and an electro-hydraulic valve for controlling said servomotor in accordance with the signal from the synchronizing network, a solenoid operated valve means connected in parallel with said electro-hydraulic valve for operating said servomotor at high speed to effect rapid traverse of said element toward the position dictated by the command signal, and means controlled by said synchronizing network for effecting operation of said solenoid operated valve means.

8. The servomechanism of claim 7 wherein said multi-speed synchro transmission includes a low speed synchro and a high speed synchro, and wherein said synchronizing network includes means for energizing said solenoid operated valve means when said low speed synchro is in control, and for deenergizing said solenoid operated valve means when said high speed synchro is in control.

9. The control mechanism for a machine tool comprising a pair of spaced apart, parallel ways, a gantry mounted for movement along each of said ways, a swivel on each of said gantrys, a beam supported on said swivel, a cutter supported on said beam for movement thereon along a line passing through the pivot points of said swivels, and means for moving said gantrys to preselected positions on said ways including a data storage element associated with each gantry, synchro transmitter means associated with each element, a sensing mechanism for reading off the data from each storage element and transmitting it to its associated transmitter means, synchro receiver means electrically connected with said synchro transmitter means, and means controlled by said synchro receiver for moving the gantrys to positions corresponding to the data read off of said storage elements.

10. A control mechanism for a machine tool comprising a pair of spaced apart, parallel ways, a gantry mounted for movement along each of said ways, a swivel on each of said gantrys, a beam supported on said swivels, a cutter supported on said beam for movement thereon along a line passing through the pivot points of said swivels, and means for moving said gantrys to preselected positions along said ways including a group of stepped cams associated with each gantry, a group of independently operable synchro transmitters associated with each group of cams, there being one transmitter for each cam, a sensing mechanism for setting said transmitters to positions corresponding to the steps on said cams, a group of synchro receivers associated with each group synchro transmitters, said receivers being geared together for conjoint rotation at different speeds, electrical leads for connecting the stators of said synchro transmitters with the stators of said synchro receivers, and means controlled by the receivers of each group for moving the gantry associated therewith to positions determined by the steps on its associated group of cams.

11. The control mechanism of claim 10 including means for switching the connections between the stator leads of said synchros to reverse the sense of said synchro receivers and thereby cause said moving means to move the gantries to a different set of positions under the control of said cams.

References Cited in the file of this patent

UNITED STATES PATENTS

| | | |
|---|---|---|
| 1,745,961 | Tanner | Feb. 4, 1930 |
| 2,575,792 | Bullard et al. | Nov. 20, 1951 |
| 2,691,206 | Kautz | Oct. 12, 1954 |
| 2,742,824 | Watson et al. | Apr. 24, 1956 |
| 2,748,665 | Senn | June 5, 1956 |